United States Patent
Mitani

(10) Patent No.: US 10,200,619 B2
(45) Date of Patent: Feb. 5, 2019

(54) ELECTRONIC DEVICE, CONTROL METHOD THEREFOR, AND REMOTE CAPTURING SYSTEM

(71) Applicant: CANON KABUSHIKI KAISHA, Tokyo (JP)

(72) Inventor: Shigeyuki Mitani, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 131 days.

(21) Appl. No.: 15/397,292

(22) Filed: Jan. 3, 2017

(65) Prior Publication Data

US 2017/0195577 A1 Jul. 6, 2017

(30) Foreign Application Priority Data

Jan. 5, 2016 (JP) .................................. 2016-000582

(51) Int. Cl.
 *H04N 5/232* (2006.01)

(52) U.S. Cl.
 CPC ..... *H04N 5/23296* (2013.01); *H04N 5/23203* (2013.01); *H04N 5/23209* (2013.01); *H04N 5/23293* (2013.01)

(58) Field of Classification Search
 CPC ........... H04N 5/23296; H04N 5/23219; H04N 5/23293; G02B 7/102
 See application file for complete search history.

(56) References Cited

U.S. PATENT DOCUMENTS

| | | | | |
|---|---|---|---|---|
| 6,052,509 A * | 4/2000 | Abe | ..... | H04N 5/232 348/E5.042 |
| 2002/0005907 A1* | 1/2002 | Alten | ..... | H04N 5/232 348/333.11 |
| 2003/0189649 A1* | 10/2003 | Kuno | ..... | G06F 17/30265 348/211.1 |
| 2004/0223191 A1* | 11/2004 | Murata | ..... | H04N 5/232 358/451 |
| 2005/0012824 A1* | 1/2005 | Stavely | ..... | H04N 5/23203 348/211.99 |
| 2005/0128315 A1* | 6/2005 | Mori | ..... | H04N 5/232 348/222.1 |
| 2005/0174434 A1* | 8/2005 | Chang | ..... | H04N 5/232 348/211.1 |
| 2006/0268158 A1* | 11/2006 | Ishiyama | ..... | H04N 5/23203 348/373 |

(Continued)

FOREIGN PATENT DOCUMENTS

| | | |
|---|---|---|
| JP | 2013-041000 A | 2/2013 |
| JP | 2014-027338 A | 2/2014 |

*Primary Examiner* — Abdelaaziz Tissire

(74) *Attorney, Agent, or Firm* — Cowan, Liebowitz & Latman, P.C.

(57) ABSTRACT

An electronic device generates, in accordance with an operation on an operation unit, a zoom control command for controlling a drive unit that mechanically drives a zoom position of a lens unit attached to an image capture apparatus from the outside of the lens unit, and transmits the zoom control command to the image capture apparatus via communication unit. The electronic apparatus obtains information related to the zoom position of the lens unit from the image capture apparatus, and displays, on a display apparatus, information indicating a current zoom position of the lens unit relative to a minimum zoom position and a maximum zoom position of the lens unit.

12 Claims, 14 Drawing Sheets

(56) References Cited

U.S. PATENT DOCUMENTS

| | | | |
|---|---|---|---|
| 2007/0126883 A1* | 6/2007 | Ishige | H04N 5/23209 348/211.14 |
| 2008/0063389 A1* | 3/2008 | Fang | G03B 13/36 396/56 |
| 2009/0034951 A1* | 2/2009 | Kawasaki | G03B 17/00 396/57 |
| 2010/0079607 A1* | 4/2010 | Won | G08C 17/02 348/211.2 |
| 2010/0229130 A1* | 9/2010 | Edge | G06F 3/04883 715/863 |
| 2011/0243538 A1* | 10/2011 | Morimoto | H04N 5/23219 396/77 |
| 2013/0107062 A1* | 5/2013 | Okazaki | H04N 5/23203 348/207.1 |
| 2013/0141640 A1* | 6/2013 | Kim | H04N 5/2254 348/375 |
| 2014/0118563 A1* | 5/2014 | Mehta | G06F 3/04845 348/207.1 |
| 2016/0117829 A1* | 4/2016 | Yoon | G06K 9/4604 348/222.1 |
| 2017/0187945 A1* | 6/2017 | Ikeda | G02B 7/08 |
| 2017/0187946 A1* | 6/2017 | Kozakura | H04N 1/4433 |
| 2017/0295399 A1* | 10/2017 | Matsuda | H04N 21/43637 |

* cited by examiner

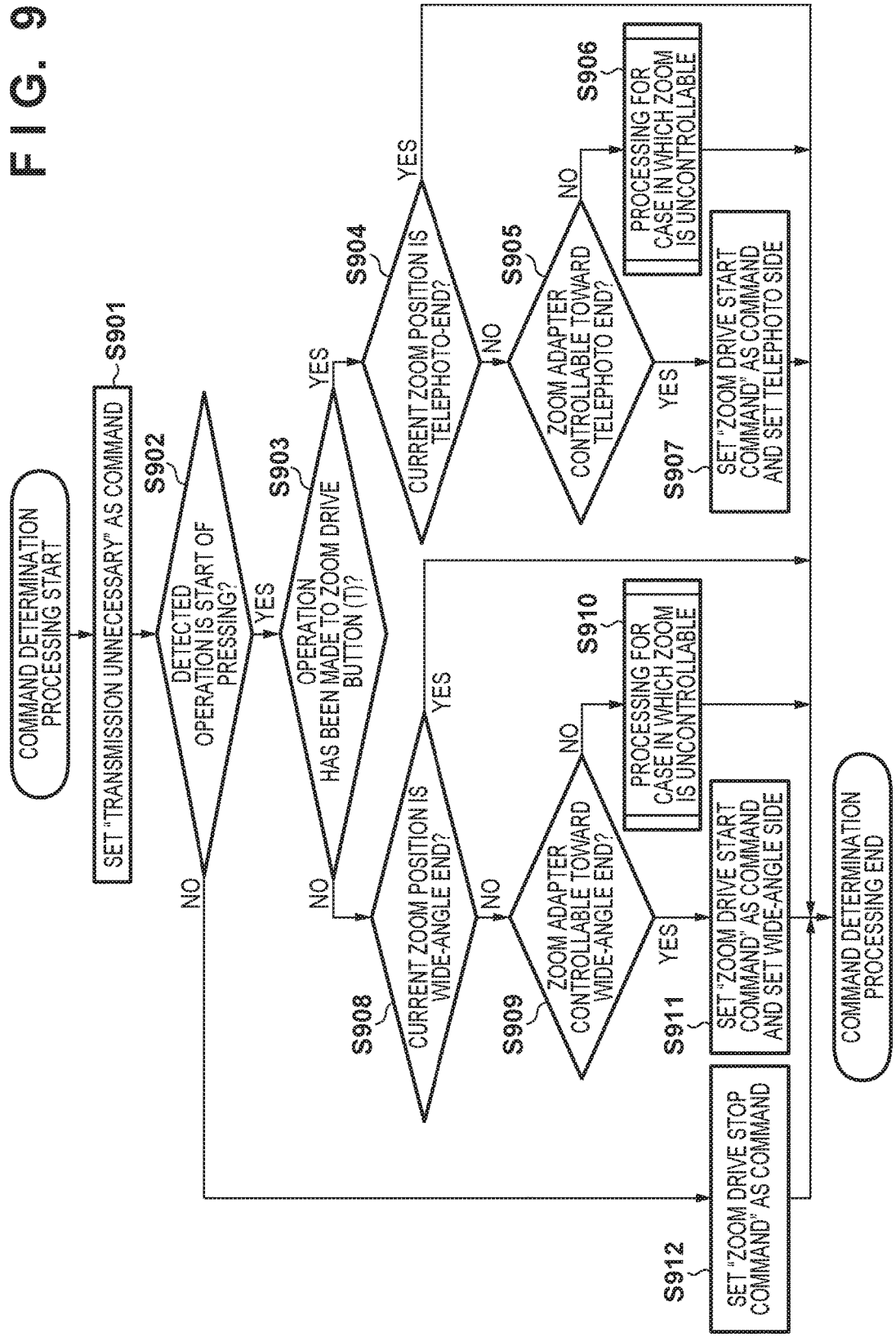

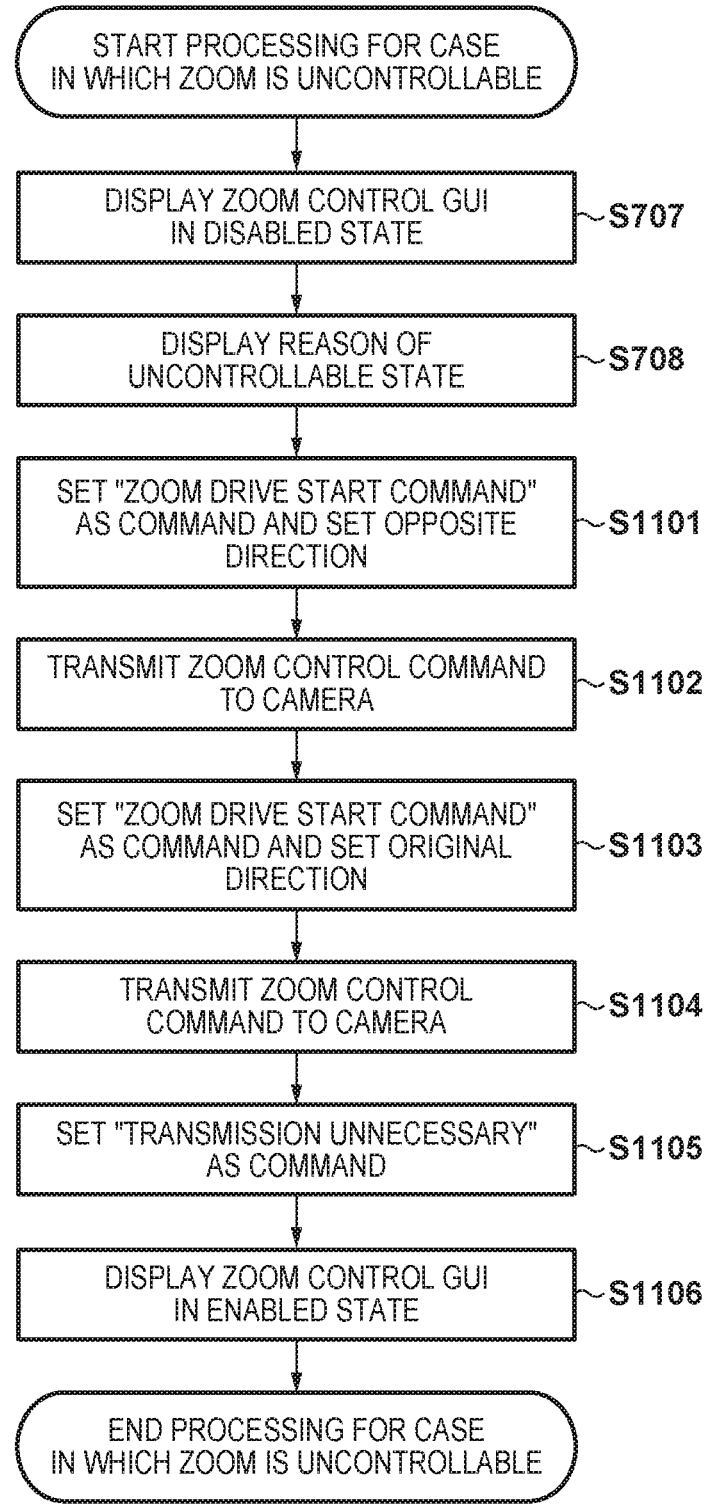

ELECTRONIC DEVICE, CONTROL METHOD THEREFOR, AND REMOTE CAPTURING SYSTEM

BACKGROUND OF THE INVENTION

Field of the Invention

The present invention relates to an electronic device, a control method therefor, and a remote capturing system.

Description of the Related Art

In some known systems, an external device displays live-view images of a digital camera via wireless communication, and remote capturing can be performed from the external device with use of the digital camera (Japanese Patent Laid-Open No. 2014-27338). In other known systems, a zoom operation of a digital camera can be remotely performed from an external apparatus when the digital camera has a non-interchangeable zoom lens.

Some lenses with a powered zoom function include a position detection unit that uses a linear encoder to detect the occurrence of missed steps of a stepper motor that drives a movable lens (Japanese Patent Laid-Open No. 2013-41000).

Most of the zoom lenses used in interchangeable-lens cameras are manual zoom lenses. In the case of remote capturing with use of a digital camera having a manual zoom lens attached thereto, the angle of view cannot be remotely changed. One possible way to remotely change the angle of view of a manual zoom lens is to use an external apparatus (zoom adapter) that mechanically drives a console member (zoom ring) intended to change the angle of view of the manual zoom lens. However, in using such an external apparatus, for example, decision making by an apparatus that remotely controls a zoom position raises problems.

SUMMARY OF THE INVENTION

According to one aspect of the present invention, a state of a manual zoom lens attached to an image capture apparatus, such as a zoom position, can be appropriately determined by an electronic device and a control method therefor that remotely operate a drive unit configured to drive the manual zoom lens from outside.

According to an aspect of the present invention, there is provided an electronic device, comprising: a communication unit configured to communicate with an image capture apparatus; a control unit configured to generate a zoom control command in accordance with an input operation and transmitting the zoom control command to the image capture apparatus via the communication unit, the zoom control command being intended to change a zoom position of a lens unit attached to the image capture apparatus; an obtaining unit configured to obtain information related to the zoom position of the lens unit from the image capture apparatus; and a display unit configured to display, on a display apparatus, information indicating a current zoom position of the lens unit relative to a minimum zoom position and a maximum zoom position of the lens unit, wherein the zoom control command controls an operation of a drive unit for mechanically driving a zoom mechanism included in the lens unit from the outside of the lens unit.

According to another aspect of the present invention, there is provided a remote capturing system, comprising: an electronic device; an image capture apparatus having a lens unit that includes a manually-operable zoom mechanism; and a drive unit that mechanically drives the zoom mechanism from the outside of the lens unit, wherein the electronic device includes: a communication unit configured to communicate with an image capture apparatus; a control unit configured to generate a zoom control command in accordance with an input operation and transmitting the zoom control command to the image capture apparatus via the communication unit, the zoom control command being intended to change a zoom position of the lens unit attached to the image capture apparatus; an obtaining unit configured to obtain information related to the zoom position of the lens unit from the image capture apparatus; and a display unit configured to display, on a display apparatus, information indicating a current zoom position of the lens unit relative to a minimum zoom position and a maximum zoom position of the lens unit, the zoom control command controls an operation of the drive unit for mechanically driving the zoom mechanism included in the lens unit from the outside of the lens unit, and the lens unit forwards the zoom control command to the drive unit.

According to a further aspect of the present invention, there is provided a control method for an electronic device that communicates with an image capture apparatus, the control method comprising: generating a zoom control command in accordance with an input operation, the zoom control command being intended to change a zoom position of a lens unit attached to the image capture apparatus; transmitting the zoom control command to the image capture apparatus; obtaining information related to the zoom position of the lens unit from the image capture apparatus; and displaying information indicating a current zoom position of the lens unit relative to a minimum zoom position and a maximum zoom position of the lens unit, wherein the zoom control command controls an operation of a drive unit for mechanically driving a zoom mechanism included in the lens unit from the outside of the lens unit.

According to another aspect of the present invention, there is provided a non-transitory computer-readable storage medium storing a program for causing a computer to function as an electronic device that includes: a communication unit configured to communicate with an image capture apparatus; a control unit configured to generate a zoom control command in accordance with an input operation and transmitting the zoom control command to the image capture apparatus via the communication unit, the zoom control command being intended to change a zoom position of a lens unit attached to the image capture apparatus; an obtaining unit configured to obtain information related to the zoom position of the lens unit from the image capture apparatus; and a display unit configured to display, on a display apparatus, information indicating a current zoom position of the lens unit relative to a minimum zoom position and a maximum zoom position of the lens unit, wherein the zoom control command controls an operation of a drive unit for mechanically driving a zoom mechanism included in the lens unit from the outside of the lens unit.

Further features of the present invention will become apparent from the following description of exemplary embodiments with reference to the attached drawings.

BRIEF DESCRIPTION OF THE DRAWINGS

FIG. 9 is a flowchart related to the operation of the mobile phone according to the embodiment (s).

FIG. 11 is a flowchart related to the operation of the mobile phone according to the second embodiment.

DESCRIPTION OF THE EMBODIMENTS

Exemplary embodiments of the present invention will now be described in detail in accordance with the accompanying drawings.

First Embodiment

Outline of Remote Capturing System

Figure 1:
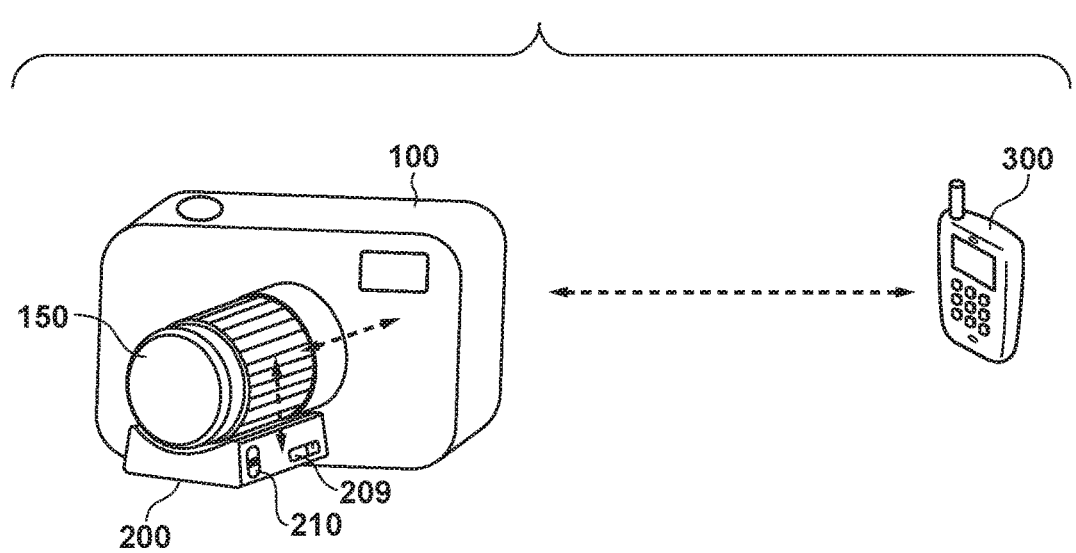
FIG. 1 is a schematic diagram showing an exemplary configuration of a capturing system according to one or more embodiments of the present invention.

FIG. 1 is a schematic diagram showing an exemplary configuration of a remote capturing system according to one or more embodiments. The remote capturing system includes a digital camera (hereinafter, "camera") 100, which is an interchangeable-lens image capture apparatus having a function of communicating with external apparatuses, and a mobile phone 300 serving as an example of an external device with which the camera 100 can communicate. An interchangeable lens 150 (lens unit) having a manual zoom function is attached to the camera 100 (camera body), and a zoom adapter 200 is attached to the interchangeable lens 150. The zoom adapter 200 is an external device for mechanically driving a zoom mechanism of the interchangeable lens 150 from the outside of the interchangeable lens.

The camera 100 and the interchangeable lens 150 perform bidirectional communication with each other via a lens connection terminal and a camera connection terminal disposed on a mount. For example, the camera 100 transmits a command related to focus control to the interchangeable lens 150. On the other hand, the interchangeable lens 150 can transmit, to the camera 100, lens-specific information indicating the maximum zoom position, the minimum zoom position, and the like, and information related to a lens state, such as the current focus lens position and zoom position.

The interchangeable lens 150 and the zoom adapter 200 perform bidirectional communication with each other via a zoom adapter connection terminal and the lens connection terminal. For example, the interchangeable lens 150 informs the zoom adapter 200 of zoom position information (the current zoom position, maximum zoom position, and minimum zoom position). The zoom adapter 200 can determine whether a zoom operation can be performed based on the zoom position information of which it has been informed. The zoom adapter 200 can also transmit information related to a state of the zoom adapter 200 to the interchangeable lens 150.

In the present embodiment, the camera 100 and the zoom adapter 200 are not physically connected, but can perform bidirectional communication with each other via the interchangeable lens 150. For example, the interchangeable lens 150 can forward to the camera 100, or inform the same of, information received from the zoom adapter 200, thereby enabling the camera 100 to obtain the information from the zoom adapter 200.

The interchangeable lens 150 can also forward to the zoom adapter 200, or inform the same of, information received from the camera 100, thereby enabling transmission of the information from the camera 100 to the zoom adapter 200. For example, by causing the camera 100 to transmit a zoom driving command that can be interpreted by the zoom adapter 200 to the interchangeable lens 150, the operations of the zoom adapter 200 can be controlled to zoom the interchangeable lens 150.

The camera 100 and the mobile phone 300 perform bidirectional communication with each other via wireless connection. Specifically, the camera 100 operates as a simple access point (simple AP) and forms a wireless LAN network. Upon operating as the simple AP, the camera 100 starts periodical transmission of a beacon signal. The mobile phone 300 detects the beacon signal, and joins the wireless LAN network formed by the camera 100. Once the camera 100 has, for example, discovered the mobile phone 300 and obtained the capabilities of the same, it establishes communication, thereby enabling bidirectional communication via the wireless LAN.

A method of bidirectional communication between the camera 100 and the mobile phone 300 is not limited to a method in which the mobile phone 300 joins the network formed by the camera 100. For example, the camera 100 and the mobile phone 300 may join a wireless LAN network formed by an external access point, and the camera 100 and the mobile phone 300 may perform bidirectional communication with each other on that wireless LAN network. The connection between the camera 100 and the mobile phone 300 need not be wireless connection, and may be wired connection (via, for example, a USB cable).

After communication is established, predetermined interaction is performed to enable the mobile phone 300 to remotely operate the camera 100. For example, once the mobile phone 300 has obtained a state of the camera 100, remote capturing with the camera 100 is enabled by the mobile phone 300 transmitting appropriate settings and capturing commands to the camera 100.

Furthermore, this connection mode enables the mobile phone 300 to perform powered zoom control via the zoom adapter 200. Specifically, the mobile phone 300 transmits, to the camera 100, a zoom control command for the zoom adapter 200 as a command for changing the angle of view of the interchangeable lens 150. This zoom control command is forwarded from the camera 100 to the interchangeable lens 150, and then from the interchangeable lens 150 to the zoom adapter 200. That is, the camera 100 and the interchangeable lens 150 relay the control command that the mobile phone 300 has transmitted with respect to the zoom adapter 200; this enables the mobile phone 300 to remotely operate the zoom adapter 200. Therefore, even if the interchangeable lens 150 is of a manual zoom type for example, the mobile phone 300 can remotely perform zoom control with respect to the interchangeable lens.

A description is now given of individual apparatuses/devices that compose the remote capturing system.

Figure 2:
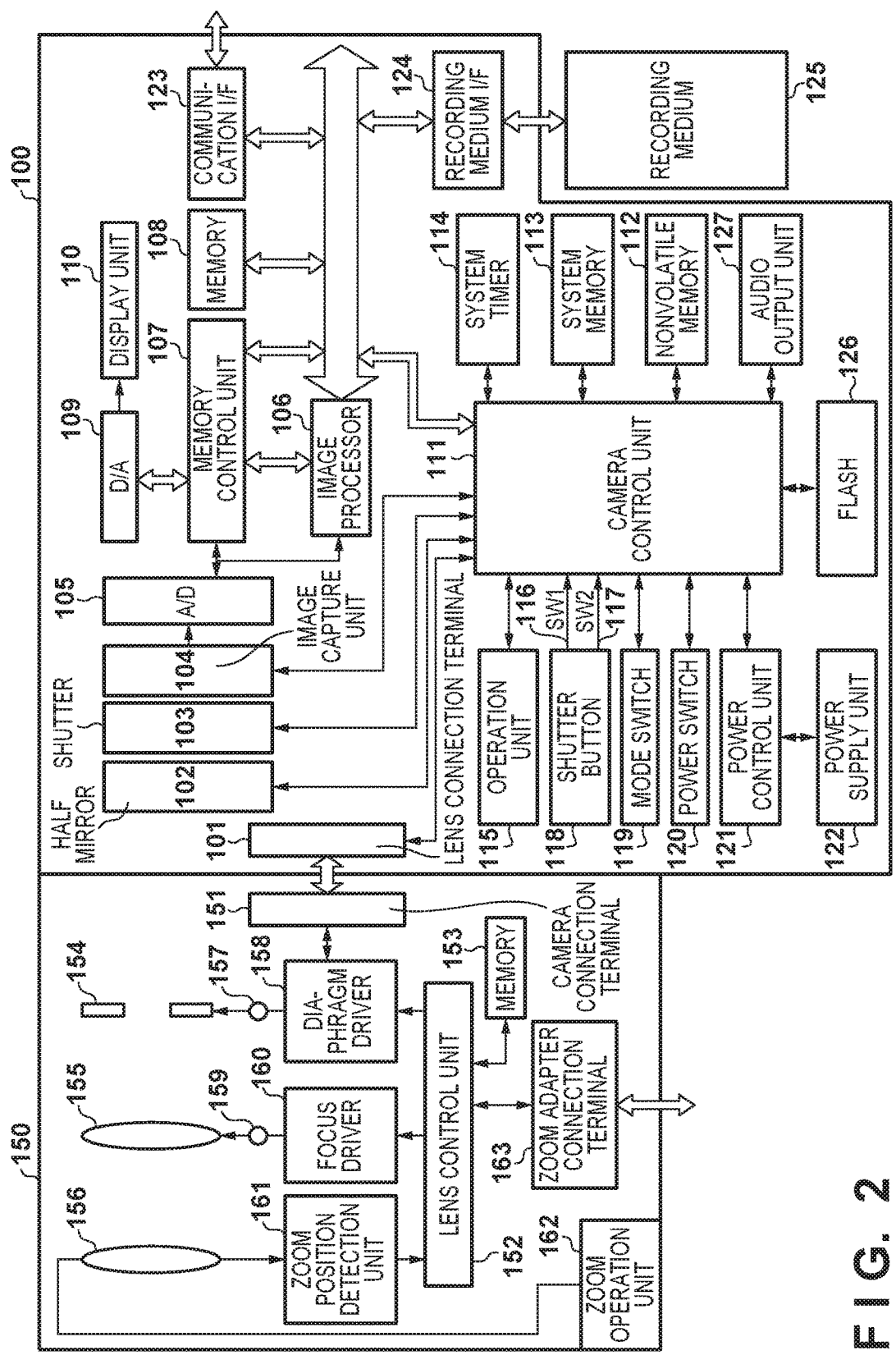
FIG. 2 is a block diagram showing exemplary functional configurations of a digital camera and an interchangeable lens according to the embodiment(s).

FIG. 2 is a block diagram showing exemplary functional configurations of the camera 100 and the interchangeable lens 150. As stated earlier, the camera 100 (camera body) is an interchangeable-lens camera, and used with the interchangeable lens 150 attached thereto.

Configuration of Digital Camera

First, the configuration of the camera 100 will be described.

The camera 100 has a lens mount that enables attachment of the interchangeable lens 150, and the lens mount includes a lens connection terminal 101. The lens connection terminal 101 includes a group of contact points that comes into contact with a group of contact groups in a camera connection terminal 151, which is included in the interchangeable lens 150, to supply power to the interchangeable lens 150, communicate with the interchangeable lens 150, etc. The substances communicated from the camera 100 to the interchangeable lens 150 include an operation state, a setting state, a command for requesting various types of information (transmission request), a focus driving command, a zoom driving command intended for the zoom adapter 200, etc.

A half-silvered mirror 102 reflects light incident from the interchangeable lens 150, and directs the reflected light to a focusing screen of an optical finder. A user can check a capturing range and a focus state by observing the focusing screen via an eyepiece lens. At the time of capturing, the half-silvered mirror 102 is retracted out of an optical path to enable the incident light to reach an image capture unit 104 via an aperture of a shutter 103. The image capture unit 104 is an image sensor that converts an optical image into an electric signal.

An A/D converter 105 converts an analog electric signal output from the image capture unit 104 into a digital electric signal (RAW data). An image processing unit 106 applies predetermined image processing to RAW data from the A/D converter 105, or to image data from a memory control unit 107. Examples of the image processing applied by the image processing unit 106 include white balance adjustment, demosaicing, color space conversion, resize processing, encoding or decoding processing, color conversion, subject detection, calculation of evaluation values used in autofocus (AF) and auto exposure control (AE), and motion vector detection. Note that these are examples of the image processing; a part of them may not be executed, and other types of image processing may be executed.

Using the evaluation values calculated by the image processing unit 106, a later-described camera control unit 111 executes through-the-lens (TTL) AF processing, AE processing, and preliminary flash emission (EF) processing. The AF processing can be executed in accordance with a contrast method in which a focus lens is moved to a position corresponding to the largest AF evaluation value of a focus detection area in a captured image. Note that one or more focus detection areas can be set. When facial detection is performed, a facial area may be included within the focus detection area(s).

RAW data from the A/D converter 105 is written to a memory 108 via both of the image processing unit 106 and the memory control unit 107, or only via the memory control unit 107. The memory 108 is used as an image buffer for storing image data, such as RAW data, image data for display, and image data for recording. The memory 108 has a storage capacity large enough to store a predetermined number of still images, and moving images and audio of a predetermined period.

The memory 108 also functions as a video memory. A D/A converter 109 converts image data for display stored in the memory 108 into an analog signal, and supplies the analog signal to a display unit 110. In this way, image data for display written to the memory 108 is displayed on the display unit 110 via the D/A converter 109. In capturing moving images, the captured moving images are sequentially displayed on the display unit 110; as such, the display unit 110 can function as an electronic viewfinder. Note that moving images, or frame images composing the moving images, intended for the electronic viewfinder function of the display unit 110 and other display apparatuses that are included in the camera 100 or connected to the camera 100 will be referred to as live-view images. Image data to be displayed on the display apparatuses include, but is not limited to, live-view image data, image data for displaying a GUI similar to a menu screen, and image data for displaying image data recorded in a recording medium 125 on the display unit 110.

A NONVOLATILE memory 112 stores programs executed by the camera control unit 111, constants, information specific to the camera 100, various types of setting values, GUI data, etc. At least a part of the NONVOLATILE memory 112 may be rewritable.

The camera control unit 111 includes, for example, one or more programmable processors (hereinafter, "MPU(s)" for convenience). A system memory 113 reads in the programs stored in the NONVOLATILE memory 112, and the MPU(s) of the camera control unit 111 executes the read programs; as a result, various constituents of the camera 100 are controlled, and various types of functions of the camera 100 are realized. These functions include a function of realizing the remote capturing system. The function of realizing the remote capturing system includes transmission, reception, interpretation and execution of commands related to the remote capturing system, display of GUIs pertaining to the remote capturing system, execution of processing corresponding to GUI operations, etc. A system timer 114 generates timing signals used in various types of control.

A mode switch 119 is used to switch to one of the following operation modes of the camera control unit 111: a still image recording mode, a moving image capturing mode, a playback mode, etc. The still image recording mode includes, for example, an auto capturing mode, an auto scene-discerning mode, a manual mode, various types of scene modes in each of which capturing settings are configured in harmony with a corresponding capturing scene, a program AE mode, and a custom mode. The mode switch 119 enables switching directly to one of these modes included in the still image capturing mode. Alternatively, another console member may be used to switch to one of these modes included in the still image capturing mode after switching to the still image capturing mode using the mode switch 119. Similarly, the moving image capturing mode may include a plurality of modes.

During an operation on a shutter button 118, that is, when this button is in a half-pressed state, a first shutter switch 116 is turned ON and generates a first shutter switch signal SW1 (capturing preparation instruction). Once the first shutter switch signal SW1 has been generated, capturing preparation operations, such as the AF processing, AE processing, auto white balance (AWB) processing and EF processing, are started.

Upon completion of the operation on the shutter button 118, that is, when this button is in a fully-pressed state, a second shutter switch 117 is turned ON and generates a second shutter switch signal SW2 (capturing instruction). Once the second shutter switch signal SW2 has been generated, the camera control unit 111 starts a series of capturing and recording operations, from reading of signals from the image capture unit 104 to writing of image data to the recording medium 125. Note that a capturing operation intended for the electronic viewfinder function of the display unit 110 in a capturing standby state will be referred to as a capturing operation for display, whereas a capturing operation performed in response to the generation of the second shutter switch signal SW2 will be referred to as a capturing operation for recording.

Functions allocated to buttons, switches, and the like included in an operation unit 115 may be fixed, or vary depending on the situation. For example, functions corresponding to the contents displayed on the display unit 110 may be allocated to direction keys, a set key, and wheels.

A power control unit 121 detects, for example, the following matters of a power supply unit 122: an attachment state, a type, a remaining amount, the number of times charge/discharge has been performed, and voltage. The power control unit 121 also supplies necessary voltages to various constituents, including the recording medium 125, for a necessary period based on the result of the detection and an instruction from the camera control unit 111. Once a power switch 120 has been turned ON, the camera control unit 111 instructs the power control unit 121 to supply power to various constituents.

The power supply unit 122 is, for example, a primary battery, a secondary battery, or an AC adapter. A recording medium I/F 124 is a communication interface with the recording medium 125. The recording medium 125, which is attachable and removable, is constituted by, for example, a semiconductor memory or a magnetic disk, and used to record image data obtained by capturing.

A communication I/F 123 is a communication interface with an external apparatus, and supports wired and wireless communications. Here, wired communication is performed via, for example, a USB cable, a LAN cable or an HDMI cable, whereas wireless communication is performed using, for example, a wireless LAN or Bluetooth®. The communication I/F 123 may be a video output terminal, and can transmit images captured by the image capture unit 104 (including live-view images) and images recorded in the recording medium 125 to an external apparatus. In the present embodiment, it will be assumed that the camera 100 (camera control unit 111) communicates with the mobile phone 300 in compliance with wireless LAN standards via the communication I/F 123; however, it can also communicate with other wireless LAN devices, such as smartphones.

An audio output unit 127 may be, for example, a speaker, and outputs audio signals output from the camera control unit 111 as audible sound.

Configuration of Interchangeable Lens

Next, the configuration of the interchangeable lens 150 will be described. A mount included in the interchangeable lens 150 has the camera connection terminal 151. The camera connection terminal 151 includes the group of contact points that comes into contact with the group of contact points in the lens connection terminal 101 included in the camera 100 to receive power supplied from the camera 100 and communicate with the camera 100.

A lens control unit 152 includes, for example, one or more programmable processors (hereinafter, "MPU(s)" for convenience). Programs stored in a NONVOLATILE memory 153 are read in, and the MPU(s) of the lens control unit 152 executes the read programs; as a result, various types of functions of the interchangeable lens 150, including communication with the camera 100 and zoom adapter 200, are realized. These functions include, for example, a function of realizing the remote capturing system, specifically, a function of forwarding or relaying commands related to the remote capturing system. The memory 153 stores programs executed by the lens control unit 152, property information and optical information specific to the interchangeable lens 150, etc.

The property information is specific information that does not change in principle, and includes the name (ID information for specifying a model), the maximum and minimum focal lengths, the fastest communication speed, the maximum aperture, and the like of the interchangeable lens 150. The optical information is optically specific information that changes in accordance with the angle of view, focus, a diaphragm value, and the like, and includes the current focal length, f-number, correction amounts (design values), manufacturing error values, etc.

The interchangeable lens 150 includes a variable-aperture diaphragm 154, as well as a focus lens 155 and a varifocal lens 156 that are movable in an optical axis direction. The interchangeable lens 150 is a capturing optical system of the camera 100, and forms an optical image of a subject on an image forming plane of the image capture unit 104.

It also includes a diaphragm motor 157 that drives the diaphragm 154, and a focus motor 159 that drives the focus lens 155. Diaphragm and focus lens positions can be detected by using stepper motors as the diaphragm motor 157 and focus motor 159 and counting the amounts of driving pulses after a reset operation. When other actuators are used as the diaphragm motor 157 and focus motor 159, a configuration for detecting diaphragm and focus lens positions may be separately installed.

The lens control unit 152 controls the operations of the diaphragm motor 157 via a diaphragm driver 158. Similarly, the lens control unit 152 controls the operations of the focus motor 159 via a focus driver 160.

A zoom operation unit 162 is a movable member, typically a zoom ring, operated by a user to change the angle of view of the interchangeable lens 150. The interchangeable lens 150 has a moving mechanism for moving the varifocal lens 156 on an optical axis in coordination with a movement of the zoom operation unit 162. In the present embodiment, an operation on the zoom operation unit 162 and the moving mechanism mechanically coordinate with each other, and the interchangeable lens 150 is a manual zoom lens.

A zoom position detection unit 161 detects the position of the varifocal lens 156. The zoom position detection unit 161 is constituted by, for example, a potentiometer, and outputs an electric signal corresponding to the position of the varifocal lens 156.

The lens control unit 152 applies A/D conversion to the electric signal output from the zoom position detection unit 161, and stores the resultant signal as digital data to the memory 153. Data indicating correspondence between positions of the varifocal lens 156 and angles of view may be prestored to, for example, the memory 153; in this case, the lens control unit 152 can obtain the current angle of view based on the signal output from the zoom position detection unit 161.

Data indicating correspondence between focus lens positions and subject distances, and data indicating correspondence between diaphragm positions and f-numbers, may be stored to, for example, the memory 153; in this case, the lens control unit 152 can obtain a subject distance based on the focus lens position, and obtain an f-number based on the diaphragm position.

The interchangeable lens 150 also includes a zoom adapter connection terminal 163 for connecting the attachable/detachable zoom adapter 200 to the interchangeable lens 150. The interchangeable lens 150 performs bidirectional communication with the zoom adapter 200 in a connected state via the zoom adapter connection terminal 163. The lens control unit 152 detects whether the zoom adapter 200 is connected, and stores information indicating the result of the detection. In response to connection or detaching of the zoom adapter 200, the lens control unit 152 updates the information indicating whether the zoom adapter 200 is connected.

Configuration of Zoom Adapter

Figure 3:
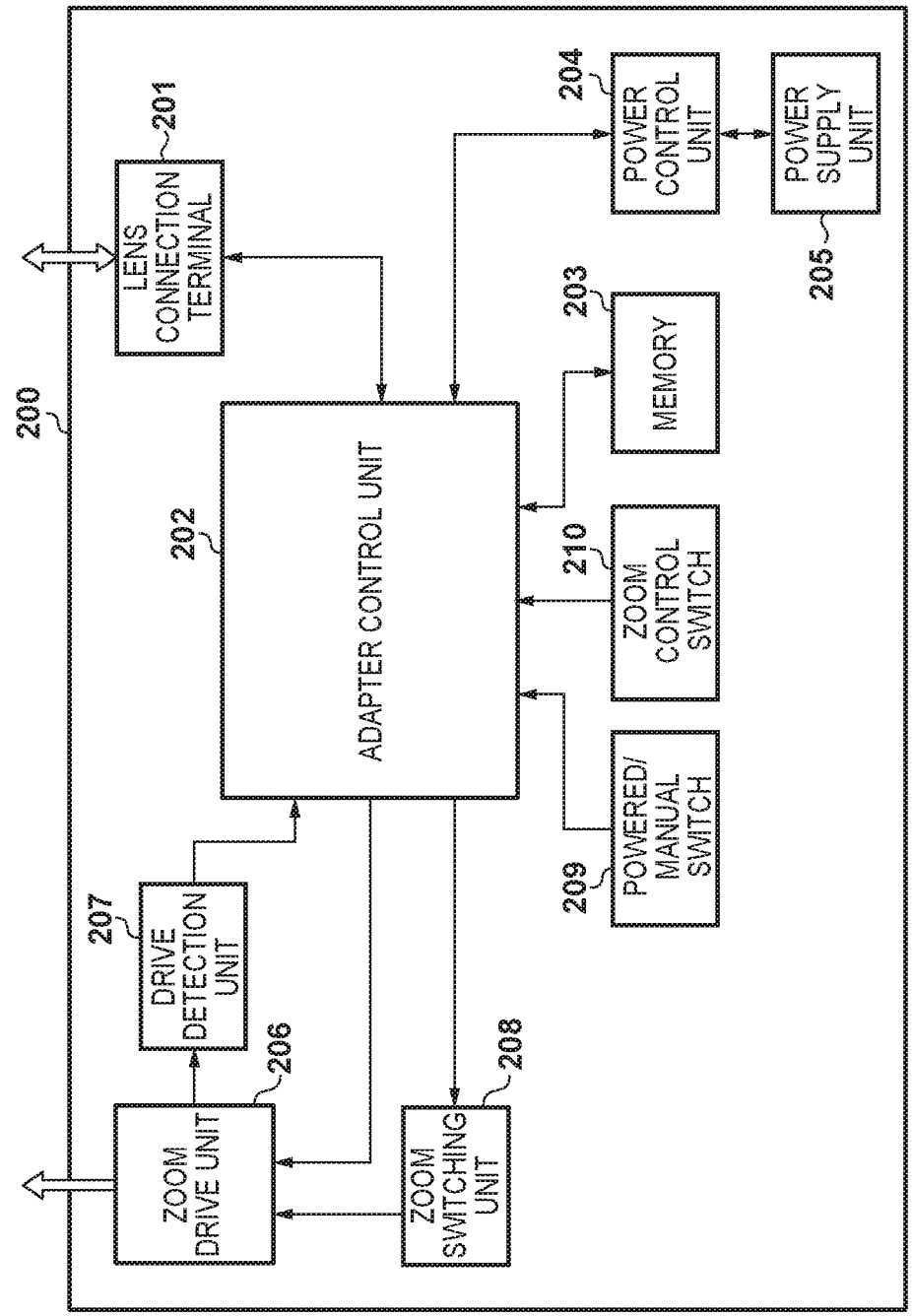
FIG. 3 is a block diagram showing an exemplary functional configuration of a zoom adapter according to the embodiment(s).

Next, a description is given of the zoom adapter 200 that is connectable to the interchangeable lens 150 serving as a zoom lens with reference to FIG. 3. The zoom adapter 200 is a drive unit that enables powered zoom of the interchangeable lens 150 by mechanically driving a member (e.g., the zoom ring) intended to operate the zoom mechanism of the interchangeable lens 150 from outside.

The zoom adapter 200 includes a lens connection terminal 201 that is connectable to the zoom adapter connection terminal 163 of the interchangeable lens 150, and enables bidirectional communication between the interchangeable lens 150 and the zoom adapter 200.

An adapter control unit 202 includes, for example, one or more programmable processors (hereinafter, "MPU(s)" for convenience). Programs stored in a NONVOLATILE memory 203 are read in, and the MPU(s) of the adapter control unit 202 executes the read programs; as a result, various types of functions of the zoom adapter 200, including communication with the interchangeable lens 150 or communication with the camera 100 via the interchangeable lens 150, are realized. These functions include functions of realizing the remote capturing system, such as transmission, reception, interpretation and execution of commands related to the remote capturing system.

The memory 203 stores programs executed by the adapter control unit 202, status information and control information of the zoom adapter 200, etc. The status information includes various types of information related to the current state of the zoom adapter 200, such as information related to a remaining amount of power, a setting state of a later-described powered/manual switch 209, and a setting value of a zoom speed. The status information also includes information indicating whether the zoom adapter 200 is in a controllable state. The control information is related to, for example, the capabilities of the zoom adapter 200, such as a list of driving speeds that can be set in remote zoom driving, and items and contents that can be set from outside. The current set value of a zoom speed may be included in the control information. The adapter control unit 202 reads out the status information and control information from the memory 203 and transmits them in response to an external request.

A power control unit 204 detects, for example, the following matters of a power supply unit 205: an attachment state, a type, a remaining amount, the number of times charge/discharge has been performed, and voltage. The power control unit 204 also supplies necessary voltages to various constituents for a necessary period based on the result of the detection and an instruction from the adapter control unit 202. The power supply unit 205 is constituted by, for example, a primary battery, such as an alkaline battery and a lithium battery, or a secondary battery, such as a NiCd battery, a NiMH battery and a Li battery.

A zoom drive unit 206 is an actuator that operates in accordance with a command from the adapter control unit 202, and mechanically drives the zoom operation unit 162 (and coordinating zoom mechanism) of the interchangeable lens 150. The zoom drive unit 206 includes, for example, a drive member that comes into contact with the zoom ring constituting the zoom operation unit 162, and a motor that moves (e.g., rotates) the drive member. Moving the drive member causes the zoom ring to rotate due to a frictional force between the drive member and the zoom ring, thereby driving the zoom mechanism inside the interchangeable lens 150.

No particular limitation is intended regarding the material and shape of the drive member included in the zoom drive member 206; the drive member may be, for example, a roller, belt or gear having a surface shape that meshes with knurls formed on a surface of the zoom ring. Alternatively, the drive member may be, for example, a roller or belt that has, at least on a surface that comes into contact with the zoom ring, a member that generates a sufficient frictional force to drive the zoom ring. As such, the zoom adapter 200 realizes, via the zoom drive unit 206, an operation similar to a user's manual operation of rotating the zoom ring. Note that the interchangeable lens 150 may include a dedicated drive member to be driven by the zoom adapter 200.

A drive detection unit 207 detects a driving direction and driving amount of the zoom drive unit 206, and informs the adapter control unit 202 of the detected driving direction and driving amount.

In accordance with an instruction from the adapter control unit 202, a zoom switching unit 208 switches between a state in which driving of the zoom operation unit 162 by the zoom drive unit 206 is enabled and a state in which such driving is disabled. For example, the zoom switching unit 208 can physically disable driving of the zoom operation unit 162 by breaking contact between the drive member of the zoom drive unit 206 and the zoom operation unit 162. Alternatively, the zoom switching unit 208 may electrically disable driving of the zoom operation unit 162 by disabling a driving instruction of the zoom drive unit 206.

By disabling driving of the zoom operation unit 162 by the zoom drive unit 206, a conventional manual operation on the zoom operation unit 162 is enabled even when the zoom adapter 200 is in a connected state.

The adapter control unit 202 can set whether the zoom switching unit 208 enables or disables driving of the zoom operation unit 162 by the zoom drive unit 206 in accordance with, for example, the setting of the powered/manual switch 209.

A zoom control switch 210 is used to perform a powered zoom operation of the interchangeable lens 150 via the zoom adapter 200. The zoom control switch 210 can be, for example, a slidable lever; in this case, the adapter control unit 202 is informed of a moving direction and moving amount of the lever. The adapter control unit 202 controls the driving direction and driving speed of the zoom drive unit 206 in accordance with the moving direction and moving amount of the zoom control switch 210. When manual zoom is set by the powered/manual switch 209, the adapter control unit 202 can ignore operations on the zoom control switch 210.

The adapter control unit 202 can also accept a zoom control command from outside via the lens connection terminal 201. Specifically, upon accepting a zoom control command via the lens connection terminal 201, the adapter control unit 202 performs a powered zoom operation with respect to the interchangeable lens 150 by controlling the zoom drive unit 206 based on the zoom control command.

Configuration of Mobile Phone

Figure 4:
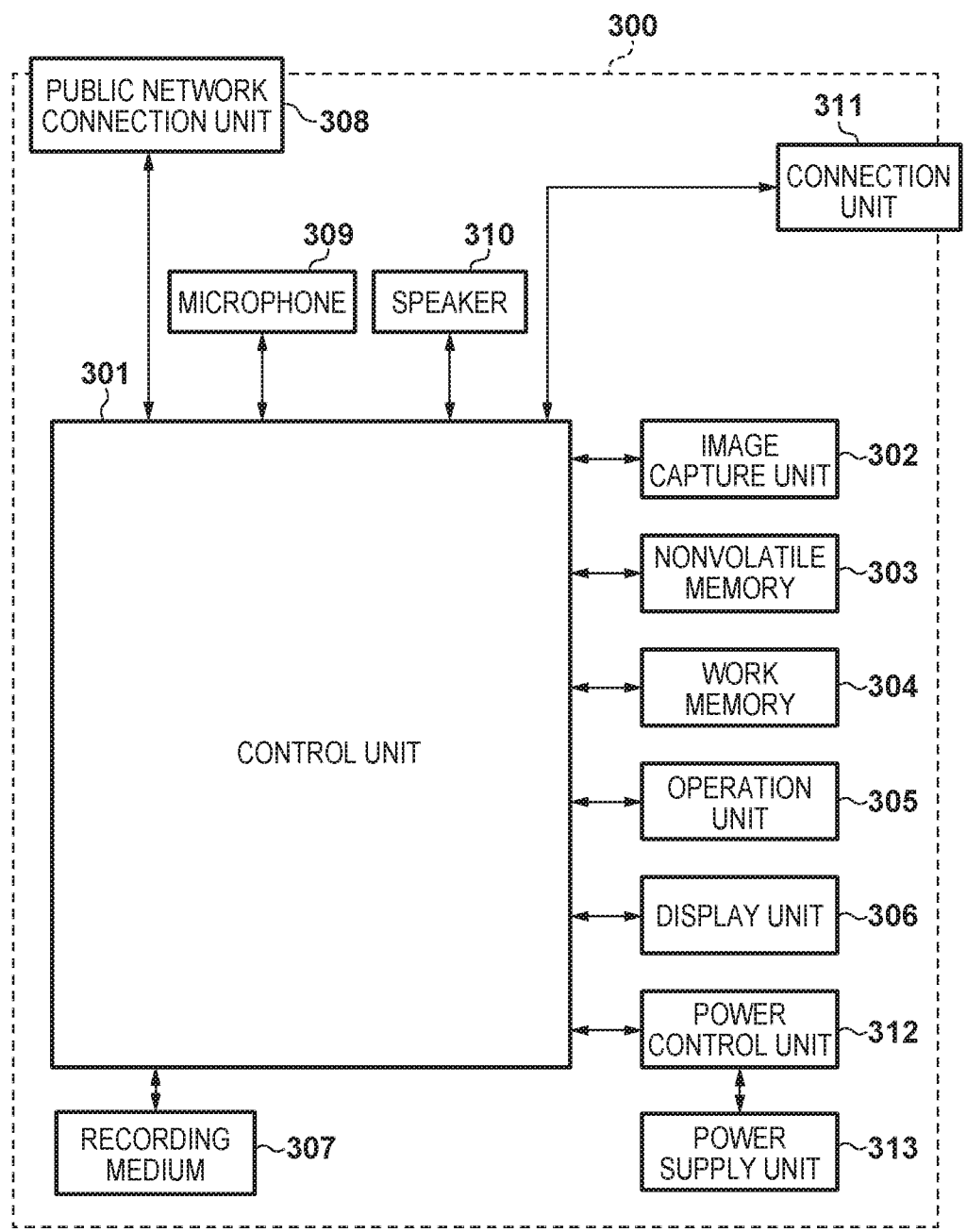
FIG. 4 is a block diagram showing an exemplary functional configuration of a mobile phone according to the embodiment(s).

Next, an exemplary configuration of the mobile phone 300 shown in FIG. 1 will be described with reference to FIG. 4. The mobile phone 300 is an example of an external apparatus with which the camera 100 can communicate, and any other electronic device that can communicate with the camera 100 can be used in place of the mobile phone 300. Examples of such an electric device include, but are not limited to, a digital camera, a media player, a tablet device, a personal computer, a smartphone, and a game device that have a wireless communication function.

A control unit 301 includes, for example, one or more programmable processors (hereinafter, "MPU(s)" for convenience). Programs stored in a NONVOLATILE memory 303 are read in, and the MPU(s) of the control unit 301 executes the read programs; as a result, various types of functions of the mobile phone 300, including communication with the camera 100, are realized. The NONVOLATILE memory 303 stores, for example, programs (OS and applications) executed by the control unit 301, various types of setting values, and GUI data. Control of the mobile phone 300 as a whole may be shared by a plurality of items of hardware, instead of being performed by the control unit 301.

The operations of the mobile phone 300 related to the remote control system, which will be described below, are realized as the control unit 301 executes programs stored in the NONVOLATILE memory 303 as a camera communication application. The camera communication application realizes, for example, transmission, reception, interpretation and execution of commands related to the remote capturing system, display of GUIs pertaining to the remote capturing system, and execution of processing corresponding to GUI operations. The camera communication application has a program that uses functions provided by the OS running on the mobile phone 300. The OS running on the mobile phone 300 may include programs for realizing the operations of the mobile phone 300 according to the present embodiment.

An image capture unit 302, which functions as a camera module, includes a capturing optical system and an image sensor, and outputs image data obtained by performing capturing based on an instruction from the control unit 301 to the control unit 301. The control unit 301 applies processing that is similar to processing applied by general digital cameras to image data, and temporarily stores the resultant image data to a WORK MEMORY 304. Thereafter, the image data is stored to an image file compliant with a preset recording format, and recorded to a recording medium 307.

The WORK MEMORY 304 is used as a buffer memory that temporarily stores image data generated by the image capture unit 302, a memory intended for display on a display unit 306 (video memory), a working area for the control unit 301, etc.

An operation unit 305 is a group of input devices that enable a user to input instructions to the mobile phone 300. The operation unit 305 includes, for example, a power switch, a shutter button for the image sensor 302, and a touchscreen formed in the display unit 306.

The display unit 306 is used to display, for example, image data obtained by the image capture unit 302, a user interface for interactive operations, text messages, and information related to phone calls. The display unit 306 need not necessarily be built in the mobile phone 300. It is sufficient for the mobile phone 300 to be connectable to the display unit 306 and have a function of controlling display on the display unit 306.

The recording medium 307 is a NONVOLATILE storage medium similar to, for example, a memory card, and can record image data obtained by the image capture unit 302, data and address books received by the mobile phone 300, etc. The recording medium 307 may be attachable to and removable from the mobile phone 300, or may be built in the mobile phone 300. That is, it is sufficient for the mobile phone 300 to be able to at least access the recording medium 307.

A public network connection unit 308 is an interface used in connecting to a public wireless phone network. The mobile phone 300 can exchange sound-based phone calls and perform data communication with other phones while being connected to the public wireless phone network via the public network connection unit 308. In making and receiving phone calls, the control unit 301 receives and transmits audio signals via a microphone 309 and a speaker 310 as inputs and outputs. In the present embodiment, it will be assumed that the public network connection unit 308 includes an interface for performing communication using 3G. Note that a communication method is not limited to using 3G, and may use other techniques including so-called 4G, such as LTE, WiMAX, ADSL and FTTH.

A connection unit 311 is an interface for connecting to an external apparatus. The mobile phone 300 according to the present embodiment can communication with an external apparatus via the connection unit 311. In the present embodiment, it will be assumed that the connection unit 311 includes an interface for communicating with an external apparatus in compliance with a wireless LAN protocol (IEEE 802.11x); however, other wireless communication protocols, including Bluetooth, may be used. The control unit 301 realizes wireless communication with an external apparatus by controlling the connection unit 311.

The mobile phone 300 according to the present embodiment can operate at least as a slave apparatus in a wireless LAN infrastructure mode, and can join a network formed by a peripheral AP. The connection unit 311 and the public network connection unit 308 need not necessarily be constituted by independent items of hardware, and may be realized by a common item of hardware.

A power control unit 312 detects, for example, the following matters of a power supply unit 313: an attachment state, a type, a remaining amount, the number of times charge/discharge has been performed, and voltage. The power control unit 312 also supplies necessary voltages to various constituents for a necessary period based on the result of the detection and an instruction from the control unit 301. The power supply unit 313 is constituted by, for example, a primary battery, such as an alkaline battery and a lithium battery, a secondary battery, such as a NiCd battery, a NiMH battery and a Li battery, or an AC adapter.

A description is now given of the operations performed by various apparatuses/devices to realize remote capturing from the mobile phone 300 with use of the camera 100 in the remote capturing system.

Operations of Digital Camera

Figure 5A:
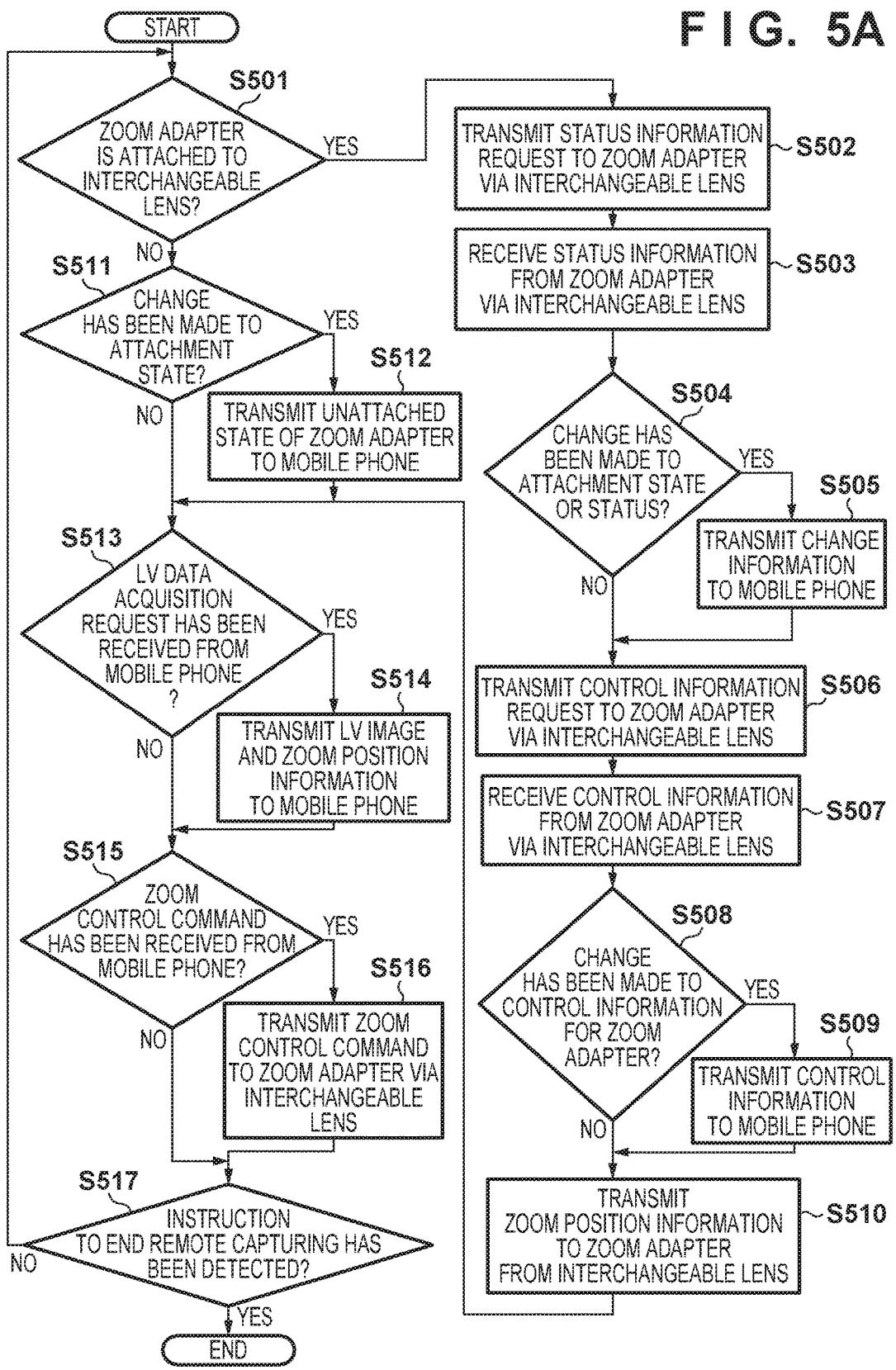
FIG. 5A is a flowchart related to the operation of the digital camera according to the embodiment (s).

First, the operations of the camera 100 will be described using the flowchart of FIG. 5A. The operations shown in FIG. 5A are started when, for example, the camera communication application of the mobile phone 300 has instructed the camera 100 to start a remote capturing operation while communication between the mobile phone 300 and the camera 100 is being established. During the remote capturing operation, the camera 100 generates a live-view image and transmits the live-view image to the mobile phone 300 periodically (e.g., at a predetermined frame rate). The camera 100 may generate the live-view image to be transmitted to the mobile phone 300 with a resolution suitable for the display unit 306 of the mobile phone 300, or transmit an image displayed on the display unit 110 as the live-view image. The mobile phone 300 causes a live-view image area of the camera communication application to function as an external EVF of the camera 100 by displaying the live-view image received from the camera 100 in the live-view image area.

In the following description, processing executed by the camera 100 is actually realized as the MPU(s) of the camera control unit 111 controls other constituents as necessary by executing a program stored in the NONVOLATILE memory 112. Similarly, processing executed by the interchangeable lens 150 is realized as the MPU(s) of the lens control unit 152 controls other constituents as necessary by executing a program stored in the memory 153. Processing executed by the zoom adapter 200 is realized as the MPU(s) of the adapter control unit 202 controls other constituents as necessary by executing a program stored in the memory 203. Processing executed by the mobile phone 300 is realized as the MPU(s) of the control unit 301 controls other constituents as necessary by executing a program (especially, the camera communication application) stored in the NONVOLATILE memory 303.

Although the camera 100 and the zoom adapter 200 directly exchange data with each other in the following description, bidirectional communication between the camera 100 and the zoom adapter 200 is actually realized as the interchangeable lens 150 relays or forwards data. The lens control unit 152 can discern whether data received from the camera 100 and the zoom adapter 200 is to be forwarded with reference to, for example, header information.

In step S501, the camera 100 obtains information from the interchangeable lens 150, and determines whether the zoom adapter 200 is attached to the interchangeable lens 150. The camera 100 proceeds to step S502 if the zoom adapter 200 is determined to be attached, and to step S511 if the zoom adapter 200 is not determined to be attached.

In step S502, the camera 100 transmits, to the interchangeable lens 150, a request to the zoom adapter 200 for status information. As stated earlier, upon discerning the zoom adapter 200 as the destination of the request, the interchangeable lens 150 forwards the request to the zoom adapter 200.

In step S503, the camera 100 receives, via the interchangeable lens 150, the status information that was transmitted by the zoom adapter 200 in response to the request transmitted in step S502. This status information is transmitted by the zoom adapter 200 in step S602 of later-described FIG. 6A and forwarded by the interchangeable lens 150.

In step S504, the camera 100 determines whether the attachment state or status information of the zoom adapter 200 has changed; it proceeds to step S505 if it is determined that the attachment state or status information has changed, and to step S506 if it is not determined that the attachment state or status information has changed.

In step S505, the camera 100 transmits the attachment state and status information of the zoom adapter 200 to the mobile phone 300. The attachment state and/or status information may be transmitted only if they have changed. Transmission timings of the attachment state and status information may differ from each other.

In step S506, the camera 100 transmits a request for control information to the zoom adapter 200 via the interchangeable lens 150.

In step S507, the camera 100 receives, via the interchangeable lens 150, the control information that was transmitted by the zoom adapter 200 in response to the request transmitted in step S506. This control information is transmitted by the zoom adapter 200 in step S604 of FIG. 6A and forwarded by the interchangeable lens 150.

In step S508, the camera 100 determines whether the control information of the zoom adapter 200 has changed; it proceeds to step S509 if it is determined that the control information has changed, and to step S510 if it is not determined that the control information has changed. Note that when making this determination for the first time, the camera 100 determines that the control information has changed (YES).

In step S509, the camera 100 transmits the control information to the mobile phone 300.

In step S510, the camera 100 requests the interchangeable lens 150 to transmit zoom position information to the zoom adapter 200. The zoom position information includes the current zoom position, maximum zoom position, and minimum zoom position of the interchangeable lens 150. These positions may be expressed in terms of angles of views or varifocal lens positions. The maximum zoom position and minimum zoom position may be transmitted only once when communication between the interchangeable lens 150 and the zoom adapter 200 is enabled, instead of being transmitted each time the present step is executed.

On the other hand, in step S511, the camera 100 determines whether the attachment state of the zoom adapter 200 has changed; it proceeds to step S512 if it is determined that the attachment state has changed, and to step S513 if it is not determined that the attachment state has changed. In step S511, only when this determination is made for the first time or immediately after the zoom adapter 200 is detached, it is determined that the attachment state has changed (YES).

In step S512, the camera 100 informs of the mobile phone 300 of an unattached state of the zoom adapter 200.

In step S513, the camera 100 determines whether a live-view data obtainment request has been newly received from the mobile phone 300; it proceeds to step S514 if it is determined that the live-view data obtainment request has been received, and to step S515 if it is not determined that the live-view data obtainment request has been received. This live-view data obtainment request is transmitted by the mobile phone 300 in step S713 of later-described FIG. 7B.

In step S514, the camera 100 transmits live-view data including a live-view image and zoom position information to the mobile phone 300. The live-view image and zoom position information may be transmitted at different timings. The maximum zoom position and minimum zoom position included in the zoom position information may be transmitted only when communication between the camera 100 and the mobile phone 300 is enabled or when the interchangeable lens 150 is replaced, instead of being transmitted in the present step. The live-view data may include any other pieces of information, such as the current capturing conditions of the camera 100 (e.g., a shutter speed, f-number, and capturing sensitivity), the positions and sizes of the focus detection area(s) and subject area (e.g., facial area), and information related to various types of settings. The mobile phone 300 can display these pieces of information together with the live-view image to enable a live-view image area of the display unit 306 to function as an EVF similar to the display unit 110 of the camera 100.

In step S515, the camera 100 determines whether a new zoom control command has been received from the mobile phone 300; it proceeds to step S516 if it is determined that the new zoom control command has been received, and to step S517 if it is not determined that the new zoom control command has been received. This zoom control command is transmitted by the mobile phone 300 in step S722 of FIG. 7B. When the zoom adapter 200 is in the unattached state, the mobile phone 300 does not issue control commands, and thus it is never determined that the zoom control command has been received in the present step. In the present embodiment, at least one of a zoom driving speed change command, a zoom driving start command and a zoom driving stop command is transmitted as the zoom control command, and the zoom adapter executes processing corresponding to a command type(s) (the details will be described later). The zoom driving start command designates a direction (telephoto side or wide-angle side).

In step S516, the camera 100 transmits the zoom control command from the mobile phone 300 to the zoom adapter 200 via the interchangeable lens 150.

In step S517, the camera 100 determines whether an instruction for ending remote capturing has been issued; it ends the processing of FIG. 5A if it is determined that the instruction for ending remote capturing has been issued, and returns to step S501 if it is not determined that the instruction for ending remote capturing has been issued. The instruction for ending remote capturing may be issued via the operation unit 70 of the camera 100, or may be received from the mobile phone 300.

Operations of Interchangeable Lens

Figure 5B:
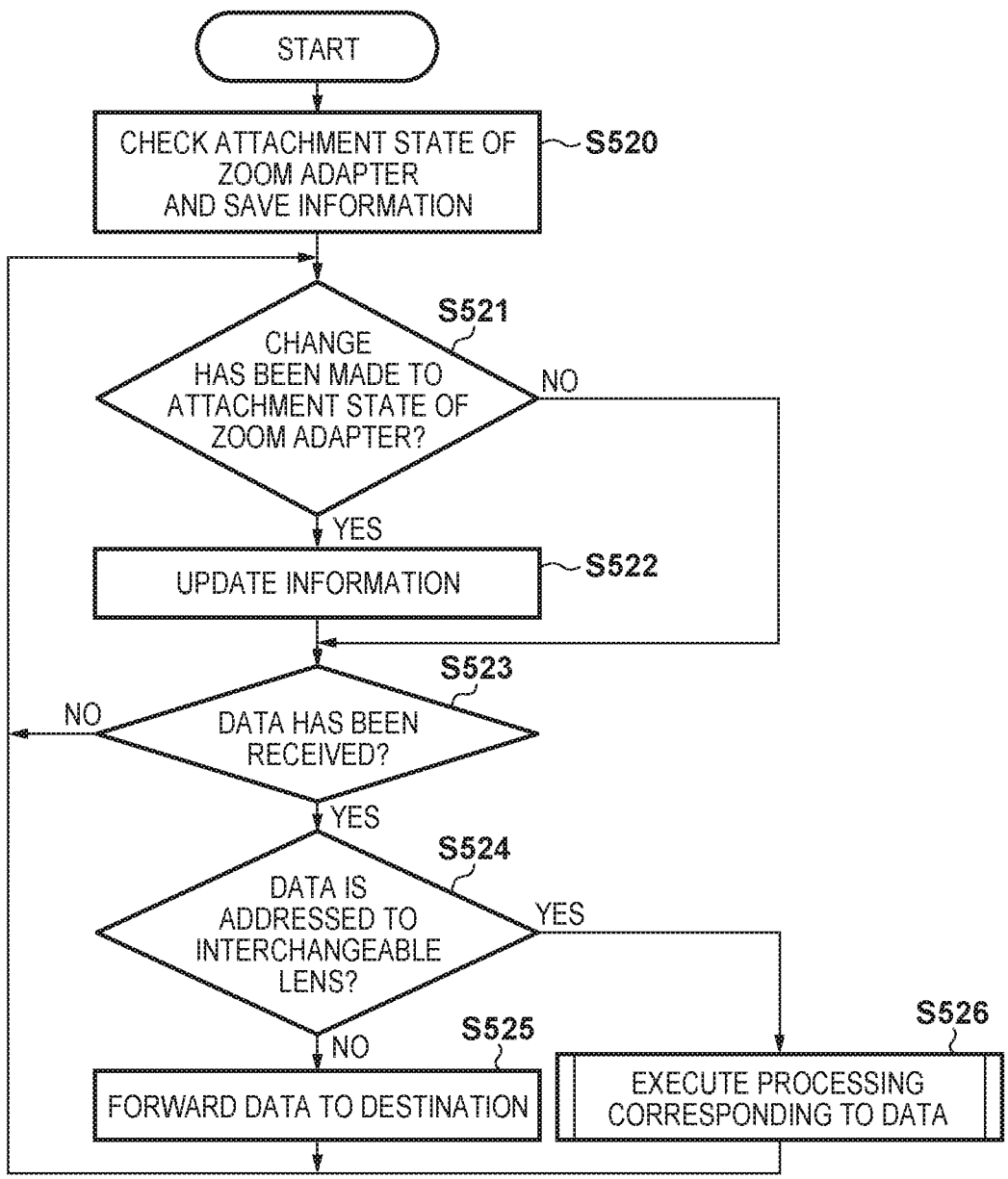
FIG. 5B is a flowchart related to the operation of the interchangeable lens according to the embodiment (s).

Next, the operations of the interchangeable lens 150 will be described using the flowchart of FIG. 5B. The operations shown in FIG. 5B are started upon attachment of the interchangeable lens 150 to the camera 100.

In step S520, the interchangeable lens 150 checks the attachment state of the zoom adapter 200 (whether it is attached), and stores information indicating the attachment state to the memory 153.

In step S521, the interchangeable lens 150 determines whether the attachment state of the zoom adapter 200 has changed; it proceeds to step S522 if it is determined that the attachment state has changed, and to step S523 if it is not determined that the attachment state has changed.

In step S522, the interchangeable lens 150 updates the information indicating the attachment state stored in the memory 153. At this time, the interchangeable lens 150 may inform the camera 100 of the change in the attachment state of the zoom adapter 200.

In step S523, the interchangeable lens 150 determines whether data has been received from the camera 100 or the zoom adapter 200; it proceeds to step S524 if it is determined that the data has been received, and returns to step S521 if it is not determined that the data has been received.

In step S524, the interchangeable lens 150 determines whether the received data is addressed to the interchangeable lens 150; it proceeds to step S526 if the received data is determined to be addressed to the interchangeable lens, and to step S525 if the received data is not determined to be addressed to the interchangeable lens. As stated earlier, the destination of the received data can be determined based on, for example, information included in a header of the data; however, the destination may be determined using other methods, for example, based on the content of the data (e.g., a command type).

In step S525, the interchangeable lens 150 forwards the data received in step S523 to the destination (zoom adapter 200 or camera 100), and returns to step S521. This data may be forwarded as-is, or a transmission source of this data may be changed to the interchangeable lens 150 in forwarding this data.

In step S526, the interchangeable lens 150 executes processing corresponding to the received data, and returns to step S521. The processing executed in step S526 includes, but is not limited to, processing for transmitting property information and optical information of the interchangeable lens 150 in response to a request from the camera 100, transmitting zoom position information to the zoom adapter 200, and driving the focus lens and diaphragm.

Operations of Zoom Adapter

Figure 6A:
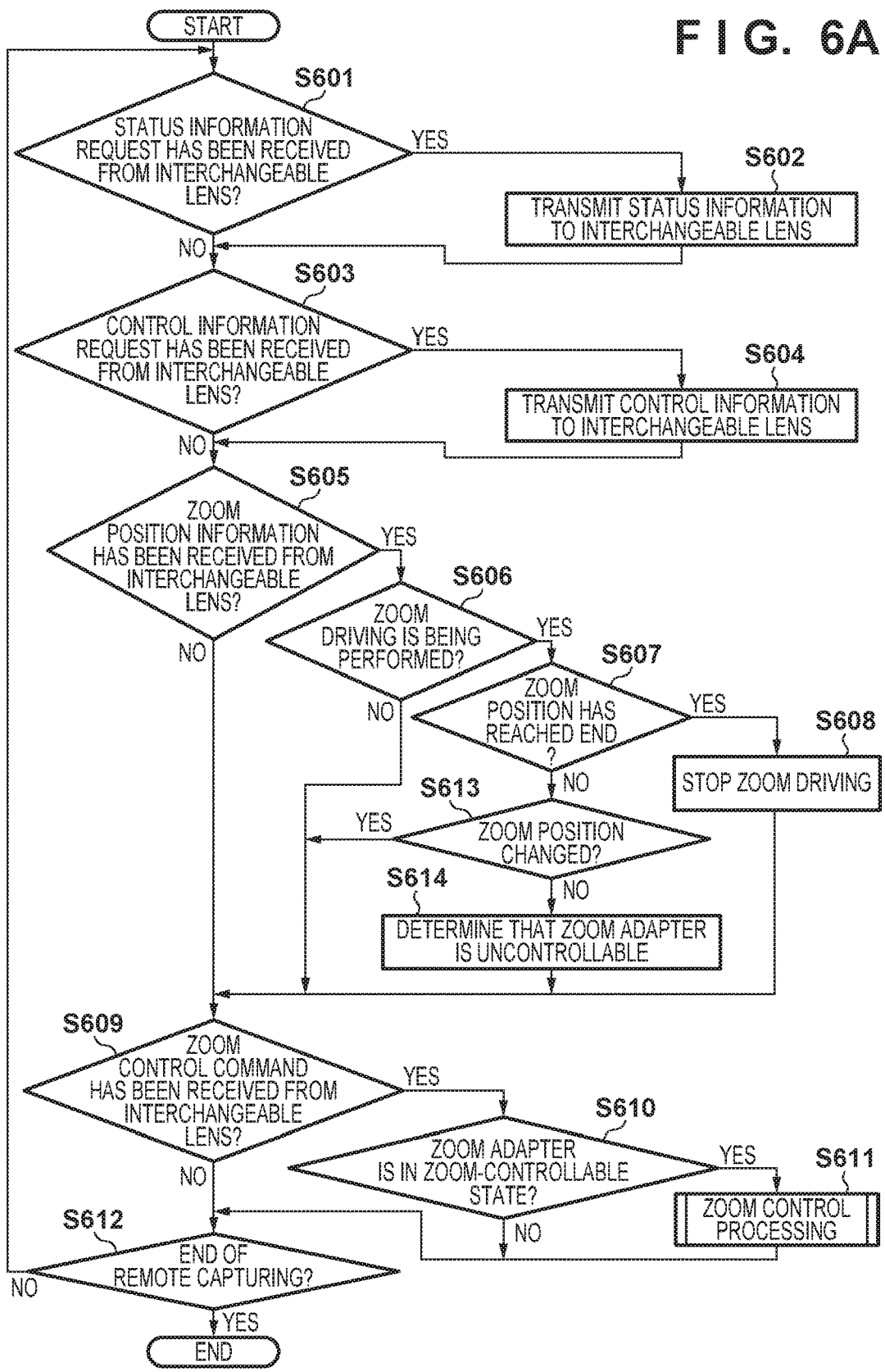
FIG. 6A is a flowchart related to the operation of the zoom adapter according to the embodiment (s).

Next, the operations of the zoom adapter 200 will be described using the flowchart of FIG. 6A. The operations shown in FIG. 6A are executed while the zoom adapter 200 is attached to the interchangeable lens 150.

In step S601, the zoom adapter 200 determines whether a request for status information has been received from the interchangeable lens 150; it proceeds to step S602 if it is determined that the request has been received, and to step S603 if it is not determined that the request has been received. This received request for status information is transmitted by the camera 100 via the interchangeable lens 150 in step S502 of FIG. 5A.

In step S602, the zoom adapter 200 informs the interchangeable lens 150 of the status information. When a transmission source of the request for status information received from the interchangeable lens 150 is the camera 100, the zoom adapter 200 may transmit the status information to the camera 100 via the interchangeable lens 150. The zoom adapter 200 transmits information to a transmission source of a request, and the same goes for other processing.

In step S603, the zoom adapter 200 determines whether a request for control information has been received from the interchangeable lens 150; it proceeds to step S604 if it is determined that the request has been received, and to step S605 if it is not determined that the request has been received. This received request for control information is transmitted by the camera 100 via the interchangeable lens 150 in step S506 of FIG. 5A.

In step S604, the zoom adapter 200 transmits the control information to the interchangeable lens 150.

In step S605, the zoom adapter 200 determines whether zoom position information has been received from the interchangeable lens 150; it proceeds to step S606 if it is determined that the zoom position information has been received, and to step S609 if it is not determined that the zoom position information has been received. This received zoom position information is transmitted by the interchangeable lens 150 as instructed by the camera 100 in step S510 of FIG. 5A.

In step S606, the zoom adapter 200 determines whether the zoom drive unit 206 is currently performing zoom driving; it proceeds to step S607 if it is determined that zoom driving is currently performed, and to step S609 if it is not determined that zoom driving is currently performed.

In step S607, the zoom adapter 200 determines whether the current zoom position is the telephoto end or wide-angle end based on the zoom position information of the interchangeable lens 150. The zoom adapter 200 proceeds to step S608 if it is determined that the zoom position of the interchangeable lens 150 is the telephoto end or wide-angle end, and to step S613 if it is not determined that the zoom position is the telephoto end or wide-angle end.

In step S608, the zoom adapter 200 stops zoom driving of the zoom drive unit 206, and proceeds to step S609.

In step S613, the zoom adapter 200 determines whether the currently-received zoom position has changed from the previously-received zoom position; it proceeds to step S609 if it is determined that the currently-received zoom position has changed, and to step S614 if it is not determined that the currently-received zoom position has changed.

In step S614, the zoom adapter 200 determines that zoom control in the direction (specific direction) in which the zoom drive unit 206 was driven in previous step S654 is currently impossible, reflects the result of this determination in the status information, and proceeds to step S609. When the actual zoom position has not changed even though the zoom drive unit 206 was driven to change the zoom position, it means that the zoom drive unit 206 cannot be driven in the instructed driving direction, or that the telephoto end or wide-angle end exists outside the driving range of the zoom drive unit 206. This situation can be caused by slippage between the zoom drive unit 206 and a zoom console member of the interchangeable lens 150, errors in driving of the zoom drive unit 206, etc.

In step S609, the zoom adapter 200 determines whether a zoom control command has been received from the interchangeable lens 150; it proceeds to step S610 if it is determined that the zoom control command has been received, and to step S612 if it is not determined that the zoom control command has been received. This received zoom control command is transmitted by the mobile phone 300 to the camera 100 in step S722 of FIG. 7B, and transmitted by the camera 100 in step S516 of FIG. 5A.

In step S610, the zoom adapter 200 determines whether the zoom adapter 200 is in a controllable state; it proceeds to step S611 if it is determined to be in the controllable state, and to step S612 if it is not determined to be in the controllable state. In the present embodiment, the zoom adapter 200 determines that it is in the controllable state except when zoom driving of the interchangeable lens cannot be performed, such as when the remaining amount of power is small and when manual zoom is set by the powered/manual switch 209; however, this determination is not limited to being made based on such a condition. The mobile phone 300 proceeds to step S612 also when it is determined that the driving direction designated by the received zoom control command matches the direction of driving that was determined to be uncontrollable in step S614. Note that the result of the determination in step S614 may not be taken into consideration in step S610, in which case it is taken into consideration in step S654 within zoom control processing of step S611.

In step S611, the zoom adapter 200 executes the zoom control processing. Note that the zoom control command received via the interchangeable lens 150 includes at least one of a zoom driving start command, a zoom driving stop command, and a zoom driving speed change command, and the zoom adapter 200 executes processing corresponding to a command type(s). The details of the control processing will be described later.

In step S612, the zoom adapter 200 determines whether an instruction for ending remote capturing has been issued; it ends the processing of FIG. 6A if it is determined that the instruction for ending remote capturing has been issued, and returns to step S601 if it is not determined that the instruction for ending remote capturing has been issued. The instruction for ending remote capturing may be transmitted by the camera 100 in step S517 of FIG. 5A, or elapse of a certain period without any communication with the interchangeable lens 150 may be regarded as issuance of the instruction for ending remote capturing.

Figure 6B:
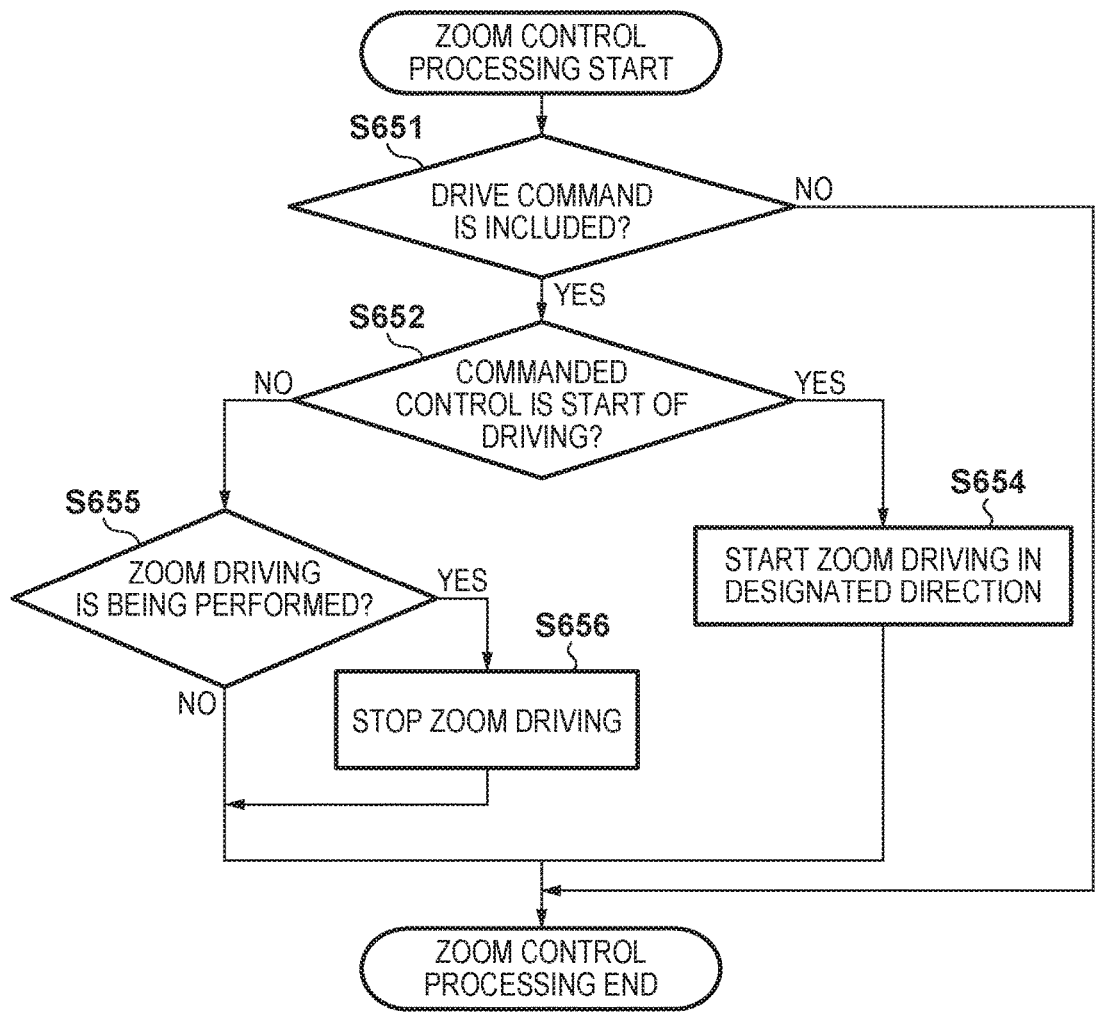
FIG. 6B is a flowchart related to the operation of the zoom adapter according to the embodiment(s).

The details of the zoom control processing executed by the zoom adapter 200 in step S611 will now be described using the flowchart of FIG. 6B.

In step S651, the zoom adapter 200 determines whether the zoom control command received from the camera 100 via the interchangeable lens 150 includes a driving command; it proceeds to step S652 if it is determined that the driving command is included, and ends the zoom control processing if it is not determined that the driving command is included. Herein, it will be assumed that the driving command is a start command or a stop command.

In step S652, the zoom adapter 200 determines whether the zoom control command received from the camera 100 is the start command; it proceeds to step S654 if the zoom control command is determined to be the start command, and to step S655 if the zoom control command is not determined to the start command (is determined to be the stop command).

In step S654, the zoom adapter 200 starts to drive the zoom drive unit 206 in the direction designated by the start command, and ends the zoom control processing. Note that in step S654, the zoom adapter 200 may check whether driving was determined to be uncontrollable in any driving direction in step S614, and may skip driving of the zoom drive unit 206 if the direction designated by the start command matches the specific direction of driving that was determined to be uncontrollable in step S614.

On the other hand, in step S655, the zoom adapter 200 determines whether the zoom drive unit 206 is currently performing zoom driving; it proceeds to step S656 if it is determined that zoom driving is currently performed, and ends the zoom control processing if it is not determined that zoom driving is currently performed.

In step S656, the zoom adapter 200 stops driving of the zoom drive unit 206, and ends the zoom control processing.

Operation of Mobile Phone

Figure 7A:
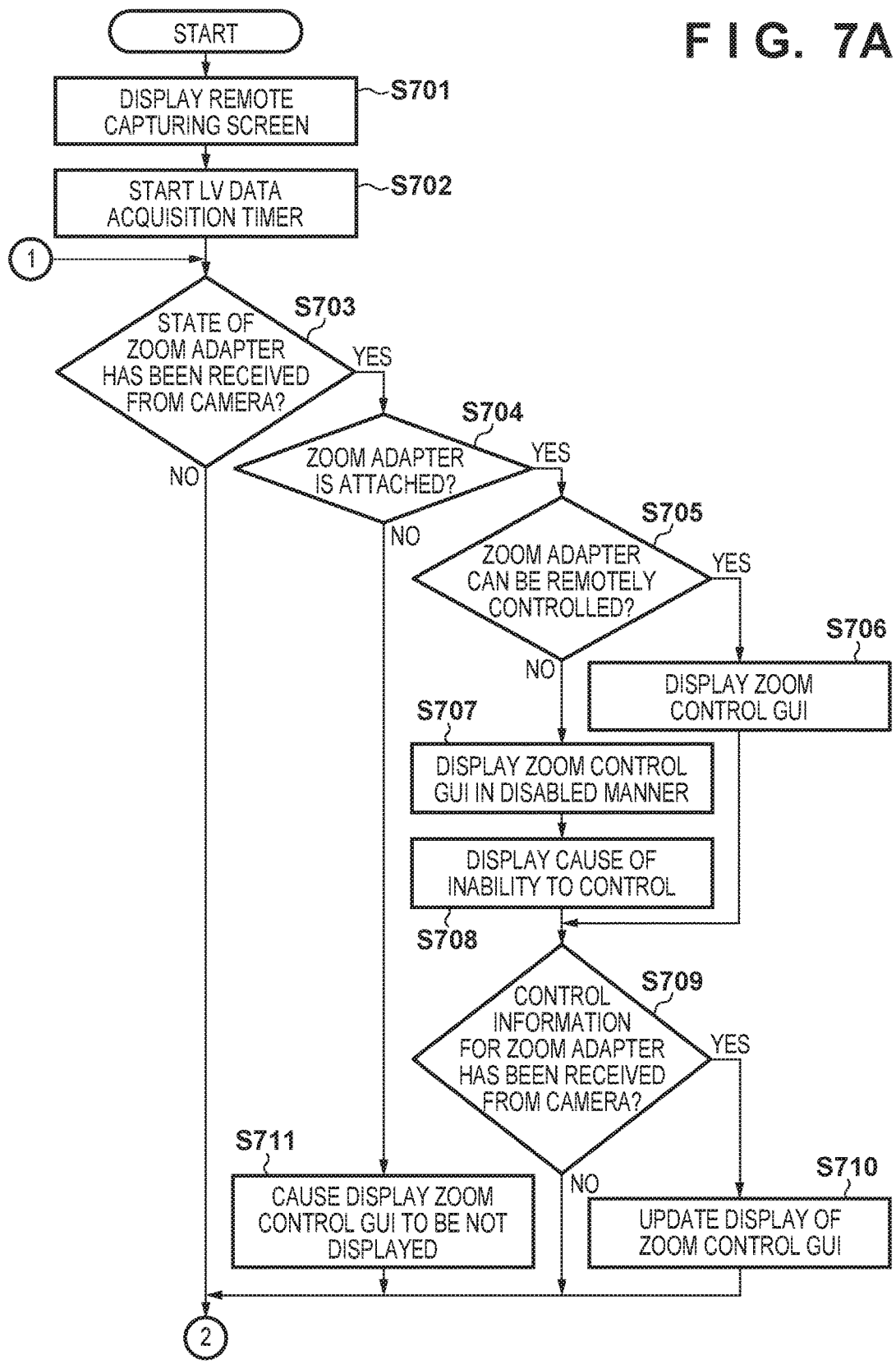
FIGS. 7A and 7B are flowcharts related to the operation of the mobile phone according to the embodiment (s).
Figure 7B:
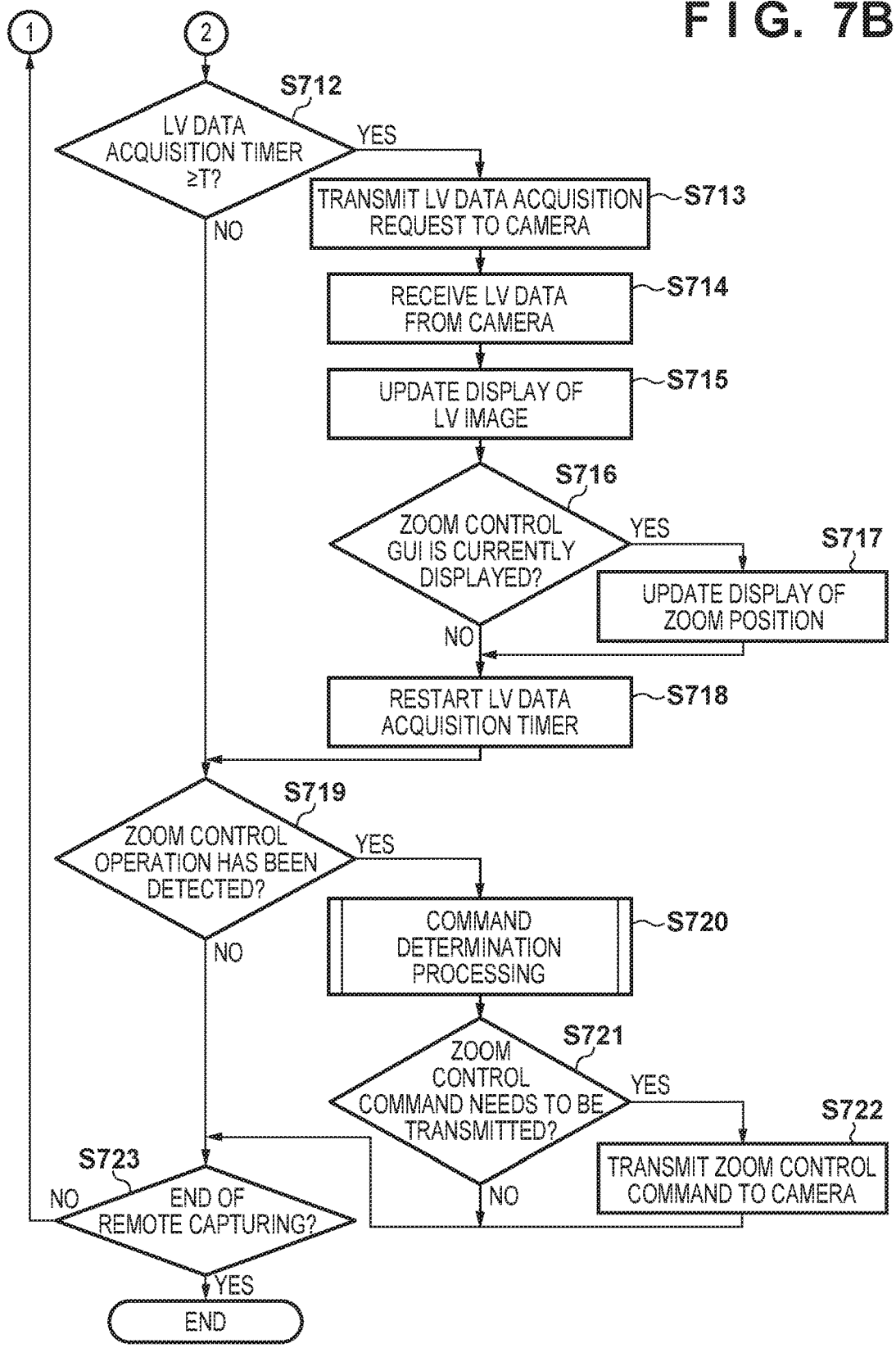

Next, the operation of the mobile phone 300 will be described using the flowcharts of FIGS. 7A and 7B. The operation shown in FIGS. 7A and 7B is started when, for example, the camera communication application of the mobile phone 300 instructs the camera 100 to start the remote capturing operation while communication between the mobile phone 300 and the camera 100 is established.

In step S701, the control unit 301 of the mobile phone 300 displays a remote capturing control screen on the display unit 306. Note that the following describes a configuration in which the display unit 306 is a touchscreen display and remote capturing control is performed in accordance with a touch operation on the display unit 306. Therefore, it will be assumed that the display unit 306 displays a screen including GUIs for touch operations. Functions of controlling remote capturing may be allocated to numeric keys and other physical input devices included in the mobile phone 300, in which case the display unit 306 may display the relationships between the keys and allocated functions instead of displaying the GUIs for touch operations. When, for example, a personal computer is used in place of the mobile phone 300, the GUIs may be operated using the combination of a keyboard and pointing device.

In step S702, the mobile phone 300 causes a live-view data obtainment timer, which is used to periodically obtain a live-view image from the camera 100, to start counting upwards.

In step S703, the mobile phone 300 determines whether information related to the state of the zoom adapter 200 (the attachment state or status information) has been received from the camera 100; it proceeds to step S704 if it is determined that the information has been received, and to step S712 if it is not determined that the information has been received. This received information related to the attachment state or the status of the zoom adapter 200 is transmitted by the camera 100 in step S505 or S512 of FIG. 5A.

In step S704, the mobile phone 300 determines whether the zoom adapter 200 is attached based on the information related to the attachment state of the zoom adapter 200; it proceeds to step S705 if the zoom adapter is determined to be attached, and to step S711 if the zoom adapter is not determined to be attached.

In step S705, the mobile phone 300 determines whether the zoom adapter 200 is in a controllable state based on the status information of the zoom adapter 200. The mobile phone 300 proceeds to step S706 if the zoom adapter 200 is determined to be in the controllable state, and to step S707 if the zoom adapter is not determined to be in the controllable state.

In step S706, the mobile phone 300 displays a zoom control GUI in an enabled (operable) state on the display unit 306. This GUI may be displayed within or outside the remote capturing control screen displayed in step S701.

On the other hand, in step S707, the mobile phone 300 displays the zoom control GUI in a disabled (inoperable) state on the display unit 306.

In step S708, the mobile phone 300 displays the reason why remote zoom control cannot be performed on the display unit 306. The reason displayed here is based on the information related to the status of the zoom adapter 200, which has been received from the camera 100, and may be associated with, for example, insufficient power voltage or a valid state of a manual zoom setting.

In step S709, the mobile phone 300 determines whether control information of the zoom adapter 200 has been received from the camera 100; it proceeds to step S710 if it is determined that the control information has been received, and to step S712 if it is not determined that the control information has been received. This received control information is transmitted by the camera 100 in step S509 of FIG. 5A.

In step S710, the mobile phone 300 updates display of the zoom control GUI on the display unit 306 in accordance with in accordance with the control information. Specifically, the mobile phone 300 can change display of a zoom driving speed in accordance with a setting value of the current zoom driving speed included in the control information, and change a settable numeric value range based on a list of values that can be set as a zoom driving speed, among others.

On the other hand, if the zoom adapter 200 is not determined to be attached in step S704, the mobile phone 300 does not display the zoom control GUI on the display unit 306 in step S711. That is, the mobile phone 300 hides the zoom control GUI if the zoom control GUI is already displayed on the display unit 306, and does not perform any operation if the zoom control GUI is not displayed.

In step S712, the mobile phone 300 determines whether a counted of the live-view data obtainment timer is equal to or larger than a prescribed value T; it proceeds to step S713 if the count is determined to be equal to or larger than the prescribed value, and to step S719 if the count is not determined to be equal to or larger than the prescribed value.

In step S713, the mobile phone 300 transmits a live-view data obtainment request to the camera 100.

In step S714, the mobile phone 300 receives live-view data including a live-view image and zoom position information from the camera 100. These received live-view image and zoom position information are transmitted by the camera 100 in step S514 of FIG. 5A.

In step S715, the mobile phone 300 updates display of the live-view image area of the display unit 306 using the live-view image received in step S714. The live-view image area may be, for example, a part of the remote capturing screen displayed in step S701.

In step S716, the mobile phone 300 determines whether the zoom control GUI is currently displayed on the display unit 306; it proceeds to step S717 if it is determined that the zoom control GUI is currently displayed, and to step S718 if it is not determined that the zoom control GUI is currently displayed. Here, when the zoom control GUI is displayed in the disabled state, it may be determined that the zoom control GUI is currently displayed.

In step S717, the mobile phone 300 updates display of the zoom position information of the interchangeable lens 150 on the zoom control GUI.

In step S718, the mobile phone 300 resets the live-view data obtainment timer, and causes the live-view data obtainment timer to start counting upwards again.

In step S719, the mobile phone 300 determines whether a zoom control operation has been detected; it proceeds to step S720 if it is determined that the zoom control operation has been detected, and to step S723 if it is not determined that the zoom control operation has been detected. Here, the mobile phone 300 can determine that the zoom control operation has been detected upon detection of an operation on the zoom control GUI via the touchscreen of the display unit 306, or an operation on a key, button, and the like to which the zoom control operation has been allocated. Alternatively, this determination may be made based on other conditions, such as an instruction issued by audio input.

When the zoom adapter 200 is not attached to the interchangeable lens 150, or when the zoom adapter 200 is uncontrollable in terms of remote zoom, the zoom control GUI is not displayed or is inoperable. In this case, it is never determined that the zoom control operation has been detected in step S719.

In step S720, the mobile phone 300 executes processing (command determination processing) for determining a zoom control command for the zoom adapter 200 to be transmitted to the camera 100 in accordance with the detected zoom control operation (the details will be described later using FIG. 9). In the command determination processing, the mobile phone 300 also determines whether it is necessary to transmit the zoom control command. For example, the mobile phone 300 can determine that it is unnecessary to transmit an impossible or ineffective zoom control command, such as a zoom control command that is issued to perform a zoom control operation toward the telephoto side (wide-angle side) when the current zoom position is the telephoto end (wide-angle end).

In step S721, the mobile phone 300 proceeds to step S722 if the command determination processing of step S720 determines that the zoom control command associated with the zoom control operation detected in step S719 needs to be transmitted, and to step S723 if the command determination processing does not determine that the zoom control command need not be transmitted.

In step S722, the mobile phone 300 transmits the zoom control command determined in step S720 to the camera 100. Specific correspondence between zoom control operations and zoom control commands will be described later using FIG. 9.

In step S723, the mobile phone 300 determines whether an instruction for ending remote capturing has been issued; it ends processing of FIGS. 7A and 7B if it is determined that the instruction for ending remote capturing has been issued, and returns to step S703 if it is not determined that the instruction for ending remote capturing has been issued. The instruction for ending remote capturing may be transmitted by the camera 100 in step S517 of FIG. 5A, or may be an instruction for ending the camera communication application issued via a touch operation on the display unit 306 or an operation on the operation unit 305.

Description of Application GUIs

As stated earlier, in the present embodiment, remote capturing control can be performed from the mobile phone 300 by operating GUIs that are displayed on the display unit 306 by the camera communication application running on the mobile phone 300. The GUIs can be operated by performing a touch operation when the display unit 306 is a touchscreen display, and by operating a key or pointing device when the display unit 306 is not a touchscreen display.

Figure 8A:
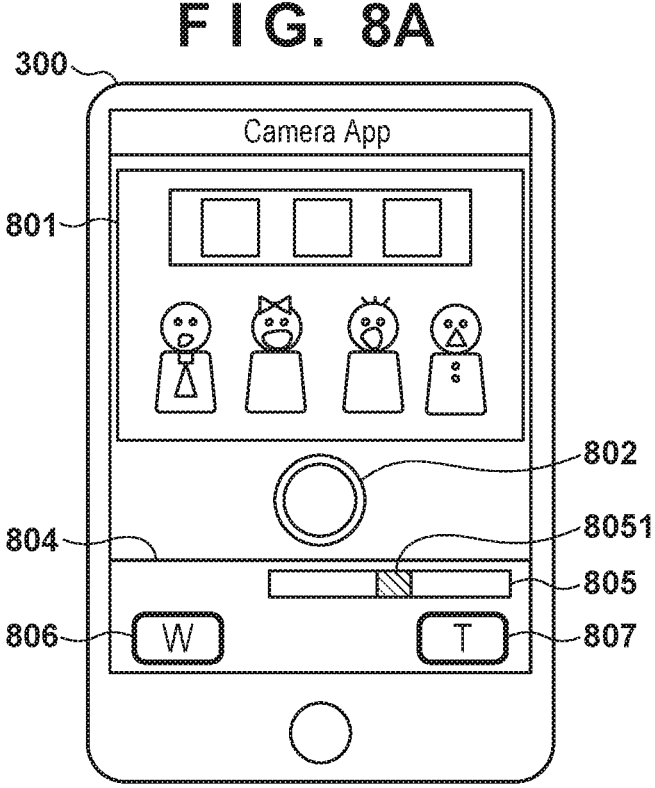
FIGS. 8A to 8C show examples of GUIs provided by an application running on the mobile phone according to the embodiment(s).
Figure 8B:
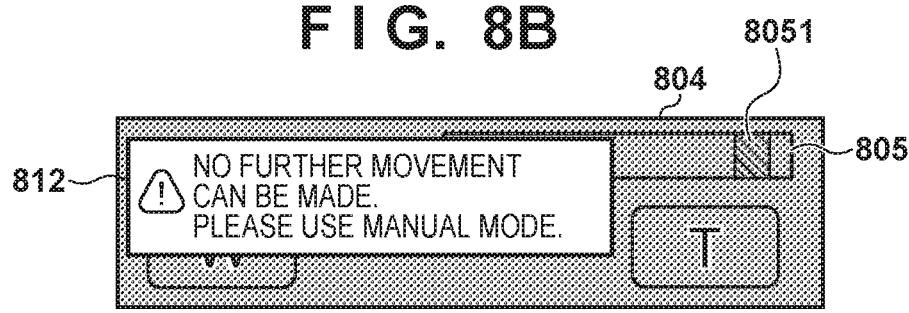
Figure 8C:
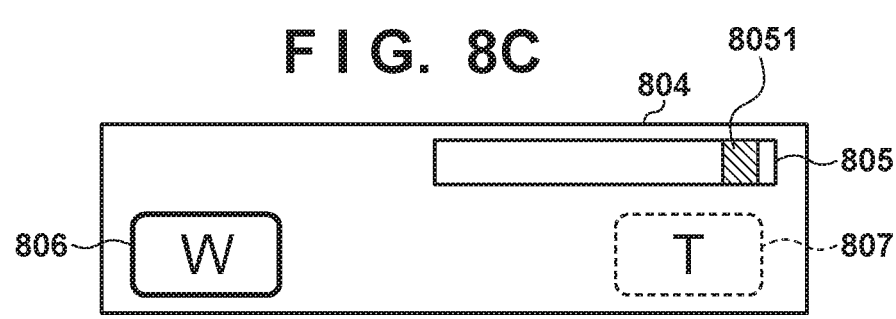

FIGS. 8A to 8C schematically show examples of a remote capturing screen and remote operation GUIs provided by the camera communication application according to the present embodiment. These figures exemplarily show a configuration in which the mobile phone 300 is a smartphone, assuming that the display unit 306 of the mobile phone 300 is a touchscreen display.

The remote capturing screen includes a live-view image area 801, as well as a remote capturing button 802 and a zoom control GUI 804 that serve as remote operation GUIs.

The live-view image area 801 displays a live-view image that the mobile phone 300 periodically receives from the camera 100, and thus functions as an external EVF of the camera 100. Display in the live-view image area 801 is updated in step S715 of FIG. 7B. The live-view image area 801 may be configured such that a focus detection position can be designated by performing a position designation operation (e.g., tapping operation) therein. For example, upon detecting a tapping operation in the live-view image area 801, the mobile phone 300 can transmit a capturing preparation request including position information indicating the tapped position to the camera 100. The camera 100 can set a focus detection area(s) based on the position information included in the capturing preparation request, and perform autofocus and auto exposure control accordingly.

The remote capturing button 802 is used to instruct the camera 100 to perform capturing. In response to a tapping operation on the remote capturing button 802, the mobile phone 300 transmits a capturing request to the camera 100. Upon receiving the capturing request, the camera 100 executes capturing processing in accordance with the settings.

The zoom control GUI 804 is used to remotely control the zoom adapter 200 from the camera communication application. The zoom control GUI 804 includes a zoom position area 805, a zoom driving button (W) 806 used to issue an instruction for zoom driving toward the wide-angle side, and a zoom driving button (T) 807 used to issue an instruction for zoom driving toward the telephoto side. As described with reference to FIGS. 7A and 7B, whether to display the zoom control GUI 804 and its display mode change based on, for example, whether the zoom adapter 200 is attached to the interchangeable lens 150 and a change in the status of the zoom adapter 200.

The zoom position area 805 displays a zoom position of the interchangeable lens 150; in the present embodiment, it displays the current zoom position relative to the wide-angle end and the telephoto end using a colored bar 8051. In the present embodiment, the left end and the right end of the zoom position area 805 represent the wide-angle end and the telephoto end, respectively, and the position of the bar 8051 indicates a relative zoom position. A method of displaying a zoom position is not limited in this way, and any other method may be used; for example, values of zoom position information transmitted by the camera 100 (e.g., the current angle of view and the minimum and maximum angles of view) may be displayed.

In response to a pressing operation on the zoom driving button 806 or 807, a zoom driving command is transmitted to the camera 100 so that zoom driving is continuously performed in the direction corresponding to the pressed button at a predetermined driving speed for the duration of the pressing operation.

Display of Zoom Control GUI in Uncontrollable State

A description is now given of display on the mobile phone 300 when the zoom adapter 200 cannot perform zoom driving control while the zoom adapter 200 is attached to the interchangeable lens 150. In the present embodiment, this condition occurs when, for example, driving of the zoom adapter 200 toward the telephoto end or the wide-angle end is uncontrollable even though the zoom position of the interchangeable lens 150 is neither the telephoto end nor the wide-angle end. This condition can occur due to mechanical errors in the zoom adapter 200, slippage of the zoom drive unit 206, etc.

FIG. 8B shows an example of the zoom control GUI that is displayed on the display unit 306 by the camera communication application running on the mobile phone 300 when the zoom adapter 200 cannot be controlled from the mobile phone 300. This example pertains to a case in which the zoom control GUI is displayed in the disabled state in step S707 and the reason is displayed in step S708 as a result of determining that zoom toward the telephoto side is uncontrollable in step S705 of FIG. 7A.

In the example of FIG. 8B, the zoom control GUI 804 is displayed in a grayed out manner, thereby visually indicating the inoperable state (disabled state). Furthermore, a warning message 812 indicating the reason of the uncontrollable state, which is determined based on the status information received in step S703 of FIG. 7A, is superimposed on the displayed zoom control GUI 804. In this example, the displayed reason of the uncontrollable state is that the zoom adapter 200 cannot be driven in the instructed driving direction. As zoom can be performed by directly operating the interchangeable lens 150, the warning message 812 indicates that zoom can be performed in a manual mode (where the interchangeable 150 is zoomed through a manual operation). Judging from the position of the bar 8051 that is displayed in the zoom position area 805 based on the zoom position of the interchangeable lens 150, a user can acknowledge that the zoom position of the interchangeable lens 150 is in front of the telephoto end.

Although driving of the zoom adapter 200 toward the telephoto end is uncontrollable, driving thereof toward the wide-angle end is controllable. Therefore, the mobile phone 300 cancels the display in the disabled state shown in FIG. 8B, for example, when any operation is performed on the operation unit 305 or after a certain period has elapsed.

FIG. 8C shows an example of the zoom control GUI 804 displayed after cancelling the display state shown in FIG. 8B. This zoom control GUI 804 has been reverted to the operable state, and its display mode has been reverted from the disabled state to the enabled state. However, as driving toward the telephoto end is uncontrollable, only the zoom driving button (T) 807 is continuously displayed in the disabled state, that is, maintained in the inoperable state. Once the zoom driving button (W) 806 has been operated, the mobile phone 300 cancels the display of the zoom driving button (T) 807 in the disabled state by enabling operations on this button.

FIG. 9 is a flowchart related to the command determination processing that is executed by the mobile phone 300 in step S720 as a result of determining that an operation on the zoom control GUI 804 has been detected in step S719 of FIG. 7B. The operation on the zoom control GUI 804 refers to one of the following operations: the start or the end of pressing of the zoom driving button (W) 806, and the start or the end of pressing of the zoom driving button (T) 807. Upon determining that one of these operations has been performed, the mobile phone 300 executes the command determination processing shown in FIG. 9. Based on a command that is set at the end of the command determination processing, the mobile phone 300 determines whether it is necessary to transmit the command in step S721 of FIG. 7B.

In step S901, the mobile phone 300 sets "transmission unnecessary" as an initial value of a command to be transmitted to the camera 100.

In step S902, the mobile phone 300 determines whether the detected operation is the start of pressing or the end of pressing, and bifurcates the processing accordingly. The mobile phone 300 proceeds to step S903 if the detected operation is determined to be the start of pressing. It proceeds to step S912 if the detected operation is determined to be the end of pressing of an operation target.

In step S903, the mobile phone 300 determines whether the target of the detected operation is the zoom driving button (W) 806 or the zoom driving button (T) 807; it proceeds to step S904 if the target is determined to be the zoom driving button (T), and to step S908 if the target is determined to be the zoom driving button (W).

In step S904, the mobile phone 300 determines whether the zoom position of the interchangeable lens 150 is the telephoto end; it ends the command determination processing if the zoom position is determined to be the telephoto end, and to step S905 if the zoom position is not determined to be the telephoto end. Whether the current zoom position is the telephoto end can be determined based on the information received from the camera 100 in step S714 of FIG. 7B. If the current zoom position is the telephoto end, further driving toward the telephoto side cannot be performed, and thus the command determination processing is ended without changing the set command (while "transmission unnecessary" is set).

In step S905, the mobile phone 300 determines whether the zoom adapter 200 is controllable toward the telephoto end; it proceeds to step S907 if the zoom adapter is determined to be controllable toward the telephoto end, and to step S906 if the zoom adapter is not determined to be controllable toward the telephoto end. The mobile phone 300 can make this determination based on the attachment state or status information of the zoom adapter 200 transmitted by the digital camera 100 in step S505 or S512 of FIG. 5A.

In step S906, the mobile phone 300 executes processing for a case in which the zoom adapter 200 is uncontrollable, and ends the command determination processing. Step S906 is executed when the status information indicates that driving toward the telephoto end or the wide-angle end cannot be performed even though the zoom position received from the camera 100 has reached neither the telephoto end nor the wide-angle end. In this case, in order to specifically indicate to a user that a further zoom operation cannot be performed, processes similar to steps S707 and S708 of FIG. 7A are executed in the present embodiment. That is, as shown in FIG. 8B, the mobile phone 300 disables operations on the zoom control GUI 804, switches to display in the disabled state, and displays the uncontrollable state and the reason thereof. Although the warning message 812 does not specifically indicate the zoom direction in which control cannot be performed in the example of FIG. 8B, the warning message 812 may specifically indicate that an operation toward the telephoto end cannot be performed in step S906.

In step S907, the mobile phone 300 sets a "zoom driving start command" as a command to be transmitted to the camera 100, sets the "telephoto side" as a driving direction parameter for the zoom driving start command, and ends the command determination processing.

On the other hand, if pressing of the zoom driving button (W) 806 is started, the mobile phone 300 determines whether the zoom position of the interchangeable lens 150 is the wide-angle end in step S908; it ends the command determination processing if the zoom position is determined to be the wide-angle end, and proceeds to step S909 if the zoom position is not determined to be the wide-angle end. Whether the current zoom position is the wide-angle end can be determined based on the information received from the camera 100 in step S714 of FIG. 7B. If the current zoom position is the wide-angle end, further driving toward the wide-angle side cannot be performed, and thus the command determination processing is ended without changing the set command (while "transmission unnecessary" is set).

In step S909, the mobile phone 300 determines whether the zoom adapter 200 is controllable toward the wide-angle end; it proceeds to step S911 if the zoom adapter is determined to be controllable toward the wide-angle end, and to step S910 if the zoom adapter is not determined to be controllable toward the wide-angle end. The mobile phone 300 can make this determination based on the attachment state or status information of the zoom adapter 200 transmitted by the digital camera 100 in step S505 or S512 of FIG. 5A.

In step S910, the mobile phone 300 executes processing for a case in which the zoom adapter 200 is uncontrollable, and ends the command determination processing. In step S910 of the present embodiment, the mobile phone 300 may execute processing similar to the processing executed in step S906. When the warning message 812 specifically indicates the direction in which control cannot be performed, the mobile phone 300 causes the warning message 812 to specifically indicate that an operation toward the wide-angle end cannot be performed in step S910.

In step S911, the mobile phone 300 sets a "zoom driving start command" as a command to be transmitted to the camera 100, sets the "wide-angle side" as a driving direction parameter for the zoom driving start command, and ends the command determination processing.

If it is determined that the operation on the zoom driving button is not the start of pressing (is the end of pressing) in step S902, the mobile phone 300 sets a "zoom driving stop command" as a command to be transmitted to the camera 100 in step S912, and ends the command determination processing.

A command that has been set through the foregoing command determination processing is transmitted to the camera 100 in step S722, unless "transmission unnecessary" is set. Then, the camera 100 transmits this command to the zoom adapter 200 via the interchangeable lens 150, and zoom driving is performed in accordance with this command. In this way, a zoom operation of the interchangeable lens 150, which is a manual zoom lens, can be remotely performed from the mobile phone 300.

In the remote capturing system according to the present embodiment, a zoom adapter, which is an external device that mechanically drives a zoom mechanism of an interchangeable lens from outside, is remotely and indirectly controlled from an electronic device that can communicate with a camera, and the electronic device displays the current zoom position. Therefore, a user of the electronic device can acknowledge a situation in which a zoom operation cannot be performed due to an uncontrollable state of the zoom adapter even though the interchangeable lens can actually be zoomed.

Second Embodiment

A second embodiment will now be described. The present embodiment pertains to another example of the processing for the case in which zoom is uncontrollable, which is executed in step S906 or S910 of the command determination processing described with reference to FIG. 9. In the present embodiment, the functional configurations of the digital camera, zoom adapter and mobile phone, as well as the operations of various apparatuses/devices other than the processing for the case in which zoom is uncontrollable, are the same as those according to the first embodiment, and thus a description thereof is omitted.

Description of Application GUIs

Figure 10A:
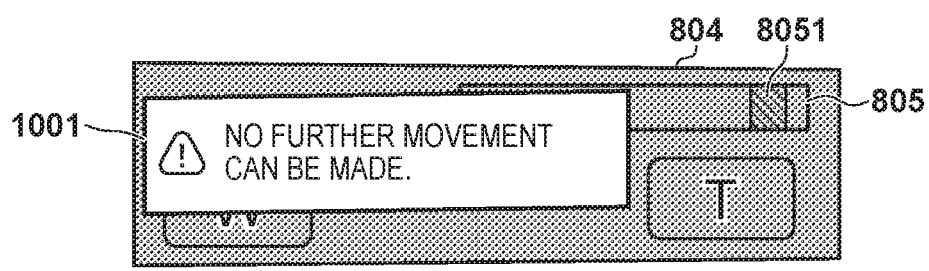
FIGS. 10A and 10B show examples of GUIs provided by the application running on the mobile phone according to a second embodiment.
Figure 10B:
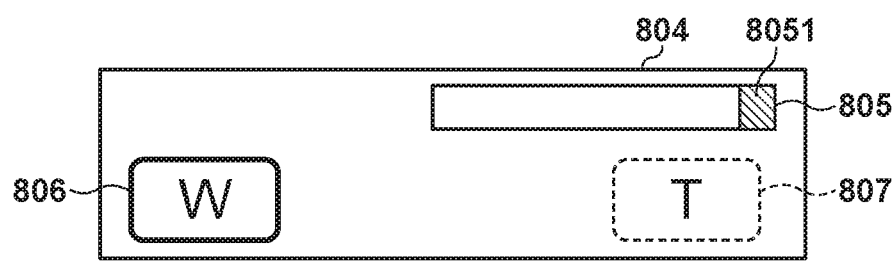

FIGS. 10A and 10B show examples of the zoom control GUI 804 that is displayed by the mobile phone 300 according to the present embodiment in the command determination processing when driving toward the telephoto end is uncontrollable even though the zoom position is not the telephoto end, or when driving toward the wide-angle end is uncontrollable even though the zoom position is not the wide-angle end. In FIGS. 10A and 10B, constituents that are similar to those of the first embodiment are given the same reference numbers as those in FIGS. 8B and 8C.

Specifically, as shown in FIG. 10A, the mobile phone 300 changes display so that the zoom control GUI 804 is displayed in the disabled state, and superimposes a warning message 1001 on the displayed zoom control GUI 804. While displaying the zoom control GUI 804 in the disabled state, the mobile phone 300 disables operations on the zoom control GUI 804.

FIG. 10A shows an example of the zoom control GUI 804 that is displayed in step S906 as a result determining that the zoom adapter is uncontrollable in terms of driving toward the telephoto end in step S905 in response to an instruction for driving toward the telephoto end. Judging from the position of the bar 8051 that is displayed in the zoom position area 805 based on the zoom position of the interchangeable lens 150, a user can acknowledge that the zoom position of the interchangeable lens 150 is in front of the telephoto end.

Although the zoom adapter 200 is uncontrollable in terms of driving toward the telephoto end, it is controllable in terms of driving toward the wide-angle end. Therefore, the mobile phone 300 cancels the display in the disabled state shown in FIG. 10A, for example, when any operation is performed on the operation unit 305 or after a certain period has elapsed.

FIG. 10B shows an example of the zoom control GUI 804 displayed after cancelling the display state shown in FIG. 10A. As shown therein, the zoom control GUI 804 has been reverted to the operable state, and its display mode has been reverted from the disabled state to the enabled state. However, as driving toward the telephoto end is uncontrollable, only the zoom driving button (T) 807 is continuously displayed in the disabled state, that is, maintained in the inoperable state. Once the zoom driving button (W) 806 has been operated, the mobile phone 300 cancels the display of the zoom driving button (T) 807 in the disabled state by enabling operations on this button.

The difference from the first embodiment is that, upon cancellation of the display state shown in FIG. 10A, the display position of the bar 8051 in the zoom position area 805 is changed. Specifically, the mobile phone 300 changes the display position of the bar 8051 in the zoom position area 805 so that the display position indicates a zoom end in the direction in which the zoom adapter 200 is uncontrollable. In the example of FIG. 10B, as the zoom adapter 200 is uncontrollable in terms of driving toward the telephoto end, the display position of the bar 8051 is changed to the position indicating the telephoto end.

If the display in the disabled state is cancelled without changing the position of the bar 8051 as in the first embodiment (FIG. 8C), the zoom driving button (T) 807 is displayed in the disabled state although zoom driving toward the telephoto end appears to be possible in the zoom position area 805. In this case, there is a possibility that a user will attempt to operate the zoom driving button (T) 807 displayed in the disabled state. There is also a possibility that the user is confused by the discrepancy between the display of the zoom position area 805 and the display of the zoom driving button in the disabled state. Either way, there is room for improvement in usability.

According to the present embodiment, when an instruction for zoom driving in the direction in which the zoom adapter 200 is uncontrollable in terms of zoom is issued in a state where the zoom position has not reached a zoom end, the mobile phone 300 changes the current zoom position displayed in the zoom position area to indicate the zoom end. In other words, the mobile phone 300 modifies the displayed zoom position to correspond to the uncontrollable state of the zoom adapter 200. This can prevent the user from experiencing the above-described confusion.

Third Embodiment

A third embodiment will now be described. The present embodiment pertains to still another example of the processing for the case in which zoom is uncontrollable, which is executed in step S906 or S910 of the command determination processing described with reference to FIG. 9. In the present embodiment, the functional configurations of the digital camera, zoom adapter and mobile phone, as well as the operations of various apparatuses/devices other than the processing for the case in which zoom is uncontrollable, are the same as those according to the first embodiment, and thus a description thereof is omitted.

Processing for Case in which Zoom is Uncontrollable

FIG. 11 is a flowchart related to the processing for the case in which zoom is controllable, which is executed by the mobile phone 300 according to the present embodiment in step S906 (or S910) of FIG. 9.

This processing is executed when the zoom adapter 200 is determined to be uncontrollable in terms of driving in the direction in which the interchangeable lens 150 can zoom in step S905 (or S909) of FIG. 9.

First, similarly to steps S707 and S708 of FIG. 7A, the mobile phone 300 disables operations on the zoom control GUI 804, displays the zoom control unit GUI 804 in the disabled state, and displays the warning message 812.

Next, in step S1101, the mobile phone 300 sets a "zoom driving start command" as a command to be transmitted to the camera 100. At this time, the mobile phone 300 sets the direction that is opposite to the direction that was requested via the operation unit 305 (zoom control GUI 804) in step S719 as a driving direction parameter for the zoom driving start command. That is, if pressing of the zoom driving button (T) 807 is detected in step S719, the mobile phone 300 sets the wide-angle side as the driving direction parameter for the zoom driving start command.

In step S1102, the mobile phone 300 transmits the zoom driving command set in step S1101 to the camera 100. This zoom driving command is forwarded to the zoom adapter 200 via the camera 100 and interchangeable lens 150, and the zoom adapter 200 is driven accordingly. As a result of driving in the direction opposite to the direction in which driving is impossible, space is created in the direction in which no movement could be made. This raises the possibility that, the next time a request for driving in the direction in which driving was determined to be impossible is received, driving can be performed.

In step S1103, the mobile phone 300 sets a "zoom driving start command" as a command to be transmitted to the camera 100. At this time, the mobile phone 300 sets the direction requested via the operation unit 305 (zoom control GUI 804) in step S719 as a driving direction parameter for the zoom driving start command. That is, if pressing of the zoom driving button (T) 807 is detected in step S719, the mobile phone 300 sets the telephoto side as the driving direction parameter for the zoom driving start command.

In step S1104, the mobile phone 300 transmits the zoom driving command set in step S1103 to the camera 100.

In step S1105, the mobile phone 300 sets a "zoom driving start command" as a command to be transmitted to the camera 100. The purpose of this is to skip the process of step S722.

Then, in step S1106, the mobile phone 300 enables an instruction for a zoom operation in the direction in which driving was previously determined to be impossible by enabling the zoom control GUI 804 and reverting the display of the zoom control GUI 804 to the enabled state shown in FIG. 8A, and ends the processing of FIG. 11. This is because the execution of the processes of steps S1101 to S1104 may have enabled driving of the interchangeable lens 150 in the direction in which driving was previously determined to be impossible.

According to the present embodiment, when the zoom adapter is determined to be uncontrollable in terms of driving in a specific direction, driving is performed in the direction opposite to the specific direction, and then an operation of re-driving in the specific direction is performed. In this way, when driving of the zoom adapter is in an uncontrollable state due to a temporary failure, there is a possibility that this uncontrollable state can be dissolved.

Other Embodiments

Advantageous effects similar to those achieved by the above-described embodiments can be achieved using methods other than the above-described methods. For example, when the zoom adapter 200 is in an uncontrollable state in terms of zoom driving toward the telephoto end, the camera 100 may execute digital zoom processing to obtain an image with a scale factor equivalent to a scale factor realized by the instructed zoom driving. Digital zoom is realized as the camera control unit 111 controls a range that the image processing unit 106 cuts out of a captured image, and a scale factor used in magnification or reduction processing. The mobile phone 300 may be configured to transmit, to the camera 100, a command for executing digital zoom with a scale factor equivalent to a change that occurs in a scale factor through a single zoom driving operation, instead of transmitting a zoom driving command.

Identification information of an interchangeable lens that cannot be moved to the telephoto end or wide-angle end under control of the zoom adapter (an interchangeable lens with a displaced zoom position) can be stored to the NONVOLATILE memory of the camera or mobile phone.

In this case, when an interchangeable lens is attached to the camera, if identification information of the interchangeable lens is stored in the NONVOLATILE memory, a warning message can be displayed on the display unit 306. This enables a user of the mobile phone 300 to acknowledge in advance the possibility of limitations on zoom driving by the zoom adapter 200.

In a case where the zoom adapter can change the zoom driving speed, the settable maximum zoom driving speed may be reduced when the zoom position has been displaced compared with when the zoom position has not been displaced. In this case, upon detection of a state in which the displacement of the zoom position has been dissolved, the settable maximum zoom driving speed may be reverted to a normal state. The state in which the displacement has been dissolved can be detected based on the state that the zoom adapter is in when the zoom position has reached the wide-angle end or telephoto end.

In a case where the zoom adapter can change the zoom driving speed, when identification information of an interchangeable lens is stored in the NONVOLATILE memory upon attachment of the interchangeable lens to the camera, the settable maximum zoom driving speed may be reduced compared with that of a normal case.

In the above-described embodiments, the zoom adapter 200 is determined to be in an uncontrollable state in terms of zoom when the zoom position received from the interchangeable lens 150 has not changed despite zoom driving. However, the zoom adapter 200 may be determined to be in the uncontrollable state in terms of zoom using other methods. For example, the adapter control unit 202 may determine that the zoom adapter 200 is in the uncontrollable state in terms of zoom based on the differences between the driving direction and driving amount instructed to the zoom drive unit 206 and the driving direction and driving amount of the zoom drive unit 206 detected by the drive detection unit 207. With this method, the zoom adapter 200 does not necessary need to identify the specific zoom position of the lens.

The drive detection unit 207 may only detect whether the interchangeable lens 150 is being driven. The adapter 202 can determine that the zoom position of the interchangeable lens 150 has reached the telephoto end or wide-angle end when the drive detection unit 207 cannot detect driving even though the zoom drive unit 206 has been instructed to perform the driving. The adapter control unit 202 may reflect the result of this determination in the status information.

For example, when the instructed driving amount and the detected driving amount do not match, or when the difference therebetween is equal to or larger than a threshold, the adapter control unit 202 may determine that zoom in the instructed driving direction is in an uncontrollable state. For example, when the zoom position has not changed despite issuance of an instruction for driving toward the telephoto side, the zoom drive unit 206 is possibly in a state where it cannot drive the interchangeable lens. In this case, the adapter control unit 202 determines that zoom toward the telephoto side is in an uncontrollable state, and can reflect the result of this determination in the status information. With this method, the uncontrollable state of zoom can be determined even if the lens position cannot be obtained from the interchangeable lens 150 during zoom driving.

In a still image capturing mode and a moving image capturing mode, whether the above-described apparatuses/devices can perform control and the substances of control may be changed in accordance with such conditions as a type of a format of a captured image file and a size of a captured image. For example, during the recording of moving images, the operations of FIG. 11 described in the third embodiment may not be executed, and the processing according to the first or second embodiment may be executed. Furthermore, digital zoom may be used in combination as stated earlier only during the recording of moving images.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. At least parts of different embodiments may be combined for implementation. The scope of the following claims is to be accorded the broadest interpretation so as to encompass all such modifications and equivalent structures and functions.

This application claims the benefit of Japanese Patent Application No. 2016-000582, filed on Jan. 5, 2016, which is hereby incorporated by reference herein in its entirety.

What is claimed is:

1. An electronic device, comprising:
a communication interface that communicates with an image capture apparatus; and
a processor that executes a program stored in a memory to function as:
  a control unit configured to generate a zoom control command in accordance with an input operation and transmitting the zoom control command to the image capture apparatus via the communication interface, the zoom control command being intended to change a zoom position of a lens unit attached to the image capture apparatus;
  an obtaining unit configured to obtain information related to the zoom position of the lens unit from the image capture apparatus; and
  a display unit configured to display, on a display apparatus, information indicating a current zoom position of the lens unit relative to a minimum zoom position and a maximum zoom position of the lens unit, wherein;
the zoom control command controls an operation of a drive unit for mechanically driving a zoom mechanism included in the lens unit from the outside of the lens unit, and
when an operation of the drive unit for changing the zoom position in a specific direction is determined to be uncontrollable in a state where the current zoom position of the lens unit is neither the minimum zoom position nor the maximum zoom position, the display unit displays the current zoom position such that the current zoom position indicates one of the minimum zoom position and the maximum zoom position corresponding to the specific direction.

2. The electronic device according to claim 1, wherein the obtaining unit obtains the information related to the zoom position together with an image captured by the image capture apparatus.

3. The electronic device according to claim 2, wherein the image captured by the image capture apparatus is a moving image to be displayed on the display apparatus.

4. The electronic device according to claim 1, wherein when an operation of the drive unit is determined to be uncontrollable, the control unit makes the input operation unacceptable.

5. The electronic device according to claim 4, wherein the control unit determines that an operation of the drive unit is uncontrollable based on information of the drive unit obtained via the image capture apparatus.

6. The electronic device according to claim 1, wherein when an operation of the drive unit for changing the zoom position toward a telephoto side is determined to be uncontrollable in a state where the current zoom position of the lens unit is neither the minimum zoom position nor the maximum zoom position, the control unit generates, in response to the input operation associated with the operation for changing the zoom position toward the telephoto side, a command for causing the image capture apparatus to execute digital zoom processing corresponding to the operation, and transmits the generated command to the image capture apparatus.

7. An electronic device, comprising:
a communication interface that communicates with an image capture apparatus; and
a processor that executes a program stored in a memory to function as:

a control unit configured to generate a zoom control command in accordance with an input operation and transmitting the zoom control command to the image capture apparatus via the communication interface, the zoom control command being intended to change a zoom position of a lens unit attached to the image capture apparatus;

an obtaining unit configured to obtain information related to the zoom position of the lens unit from the image capture apparatus; and a display unit configured to display, on a display apparatus, information indicating a current zoom position of the lens unit relative to a minimum zoom position and a maximum zoom position of the lens unit, wherein:

the zoom control command controls an operation of a drive unit for mechanically driving a zoom mechanism included in the lens unit from the outside of the lens unit, and when an operation of the drive unit for changing the zoom position in a specific direction is determined to be uncontrollable in a state where the current zoom position of the lens unit is neither the minimum zoom position nor the maximum zoom position, the control unit makes an input operation for changing the zoom position in the specific direction unacceptable, and makes an input operation for changing the zoom position in a direction opposite to the specific direction acceptable.

8. An electronic device, comprising:
a communication interface that communicates with an image capture apparatus; and
a processor that executes a program stored in a memory to function as:
  a control unit configured to generate a zoom control command in accordance with an input operation and transmitting the zoom control command to the image capture apparatus via the communication interface, the zoom control command being intended to change a zoom position of a lens unit attached to the image capture apparatus;
  an obtaining unit configured to obtain information related to the zoom position of the lens unit from the image capture apparatus; and
  a display unit configured to display, on a display apparatus, information indicating a current zoom position of the lens unit relative to a minimum zoom position and a maximum zoom position of the lens unit, wherein:
the zoom control command controls an operation of a drive unit for mechanically driving a zoom mechanism included in the lens unit from the outside of the lens unit, and
when an operation of the drive unit for changing the zoom position in a specific direction is determined to be uncontrollable in a state where the current zoom position of the lens unit is neither the minimum zoom position nor the maximum zoom position, the control unit
  generates a zoom control command for changing the zoom position in a direction opposite to the specific direction, and transmits the generated zoom control command to the image capture apparatus, and then
  generates a zoom control command for changing the zoom position in the specific direction, and transmits the generated zoom control command to the image capture apparatus.

9. The electronic device according to claim 8, wherein
once the control unit has transmitted the zoom control command for changing the zoom position in the specific direction to the image capture apparatus, the control unit makes an input operation for changing the zoom position in the specific direction acceptable.

10. A remote capturing system, comprising:
an electronic device;
an image capture apparatus having a lens unit that includes a manually-operable zoom mechanism; and
a drive unit that mechanically drives the zoom mechanism from the outside of the lens unit, wherein
the electronic device includes:
  a communication interface that communicates with an image capture apparatus; and
  a processor that executes a program stored in a memory to function as:
    a control unit configured to generate a zoom control command in accordance with an input operation and transmitting the zoom control command to the image capture apparatus via the communication unit, the zoom control command being intended to change a zoom position of the lens unit attached to the image capture apparatus;
    an obtaining unit configured to obtain information related to the zoom position of the lens unit from the image capture apparatus; and
    a display unit configured to display, on a display apparatus, information indicating a current zoom position of the lens unit relative to a minimum zoom position and a maximum zoom position of the lens unit,
the zoom control command controls an operation of the drive unit for mechanically driving the zoom mechanism included in the lens unit from the outside of the lens unit,
the lens unit forwards the zoom control command to the drive unit, and
when an operation of the drive unit for changing the zoom position in a specific direction is determined to be uncontrollable in a state where the current zoom position of the lens unit is neither the minimum zoom position nor the maximum zoom position, the display unit displays the current zoom position such that the current zoom position indicates one of the minimum zoom position and the maximum zoom position corresponding to the specific direction.

11. A control method for an electronic device that communicates with an image capture apparatus, the control method comprising:
generating a zoom control command in accordance with an input operation, the zoom control command being intended to change a zoom position of a lens unit attached to the image capture apparatus;
transmitting the zoom control command to the image capture apparatus;
obtaining information related to the zoom position of the lens unit from the image capture apparatus; and
displaying information indicating a current zoom position of the lens unit relative to a minimum zoom position and a maximum zoom position of the lens unit, wherein:
the zoom control command controls an operation of a drive unit for mechanically driving a zoom mechanism included in the lens unit from the outside of the lens unit, and when an operation of the drive unit for changing the zoom position in a specific direction is determined to be uncontrollable in a state where the current zoom position of the lens unit is neither the minimum zoom position nor the maximum zoom position, the display unit displays the current zoom position such that the current zoom position indicates one of the minimum zoom position and the maximum zoom position corresponding to the specific direction.

12. A non-transitory computer-readable storage medium storing a program for causing a computer to function as an electronic device that includes:
   a communication unit configured to communicate with an image capture apparatus;
   a control unit configured to generate a zoom control command in accordance with an input operation and transmitting the zoom control command to the image capture apparatus via the communication unit, the zoom control command being intended to change a zoom position of a lens unit attached to the image capture apparatus;
   an obtaining unit configured to obtain information related to the zoom position of the lens unit from the image capture apparatus; and
   a display unit configured to display, on a display apparatus, information indicating a current zoom position of the lens unit relative to a minimum zoom position and a maximum zoom position of the lens unit,
wherein:
the zoom control command controls an operation of a drive unit for mechanically driving a zoom mechanism included in the lens unit from the outside of the lens unit, and
when an operation of the drive unit for changing the zoom position in a specific direction is determined to be uncontrollable in a state where the current zoom position of the lens unit is neither the minimum zoom position nor the maximum zoom position, the display unit displays the current zoom position such that the current zoom position indicates one of the minimum zoom position and the maximum zoom position corresponding to the specific direction.

* * * * *